United States Patent
Kakizaki

(10) Patent No.: US 7,418,530 B2
(45) Date of Patent: Aug. 26, 2008

(54) STORAGE DEVICE AND METHOD FOR CONTROLLING STORAGE DEVICE PACKET SIZE

(75) Inventor: Yoshio Kakizaki, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 606 days.

(21) Appl. No.: 10/983,038

(22) Filed: Nov. 8, 2004

(65) Prior Publication Data

US 2006/0059279 A1 Mar. 16, 2006

(30) Foreign Application Priority Data

Sep. 16, 2004 (JP) ............... 2004-269114

(51) Int. Cl.
G06F 13/00 (2006.01)
G06F 13/38 (2006.01)

(52) U.S. Cl. .......................... 710/33; 710/66

(58) Field of Classification Search .......... 710/33, 710/66

See application file for complete search history.

(56) References Cited

U.S. PATENT DOCUMENTS 6,842,800 B2 * 1/2005 Dupont ................ 710/52
6,934,251 B2 * 8/2005 Ono ..................... 370/229

FOREIGN PATENT DOCUMENTS

JP 05-242006 9/1993

* cited by examiner

Primary Examiner—Alford W. Kindred
Assistant Examiner—Richard Franklin
(74) Attorney, Agent, or Firm—Antonelli, Terry, Stout & Kraus, LLP

(57) ABSTRACT

The present invention variably controls the packet size that is used within a storage device in accordance with the communication environment outside the storage device. The storage device comprises a CHA that controls data transfers with a host and a DKA that controls data transfers with a disk drive. The upper level I/F judgment unit of the CHA judges the type and communication band of the communication protocol used by the host and the packet size setting unit sets the optimum packet size on the basis of the type of communication protocol thus identified, and so forth. Likewise, the DKA sets the optimum packet size on the basis of the type and data processing speed of the disk drive that is used. As a result, data can be shifted rapidly to a packet in exchanges between the host and cache memory and between the disk drive and cache memory, whereby the data transfer efficiency can be improved.

14 Claims, 17 Drawing Sheets

| CHA PACKET SIZE MANAGEMENT TABLE ||||
|---|---|---|---|
| ITEM NUMBER | PROTOCOL TYPE | BANDWIDTH | PACKET SIZE |
| 1 | PA (MAINFRAME SYSTEM) | 200Mbps | ABOUT 800 BYTES |
| 2 | PB (MAINFRAME SYSTEM) | 1Gbps | ABOUT 4K BYTES |
|   |   | 2Gbps | ABOUT 8K BYTES |
| 3 | PC (OPEN SYSTEM) | 1Gbps | ABOUT 4K BYTES |
|   |   | 2Gbps | ABOUT 8K BYTES |
|   |   | (4Gbps) | ABOUT 16K BYTES |
|   |   | (10Gbps) | ABOUT 40K BYTES |
| 4 | PD (OPEN SYSTEM) | 1.25Gbps | ABOUT 4K BYTES |
| 5 | PE (OPEN SYSTEM) | 1.25Gbps | ABOUT 4K BYTES |

| DKA PACKET SIZE MANAGEMENT TABLE ||||
|---|---|---|---|
| ITEM NUMBER | DISK TYPE | BANDWIDTH | PACKET SIZE |
| 1 | DA DISK | 2Gbps | ABOUT 8K BYTES |
| | | (4Gbps) | ABOUT 16K BYTES |
| | | (10Gbps) | ABOUT 40K BYTES |
| 2 | DB DISK | 3.2Gbps | ABOUT 13K BYTES |
| 3 | DC DISK | 1.5Gbps | ABOUT 6K BYTES |
| | | (3Gbps) | ABOUT 12K BYTES |
| | | (6Gbps) | ABOUT 24K BYTES |

READ COMMAND PACKET SIZE MANAGEMENT TABLE (T1B)

WRITE COMMAND PACKET SIZE MANAGEMENT TABLE (T1A)

| ITEM NUMBER | PROTOCOL TYPE | BANDWIDTH | PACKET SIZE |
|---|---|---|---|
| 1 | PA (MAINFRAME SYSTEM) | | |
| 2 | PB (MAINFRAME SYSTEM) | | |
| 3 | PC (OPEN SYSTEM) | | |
| 4 | PD (OPEN SYSTEM) | | |
| 5 | PE (OPEN SYSTEM) | | |

STORAGE DEVICE AND METHOD FOR CONTROLLING STORAGE DEVICE PACKET SIZE

CROSS-REFERENCE TO RELATED APPLICATIONS

This application relates to and claims priority from Japanese Patent Application No. 2004-269114 filed on Sep. 16, 2004, the entire disclosure of which is incorporated herein by reference.

BACKGROUND OF THE INVENTION

1. Field of the Invention

The present invention relates to a storage device and a method for controlling the packet size of the storage device.

2. Description of the Related Art

Storage devices have disk drives such as hard disk drives arranged in the form of an array and provide storage regions on the basis of RAID (Redundant Arrays of Inexpensive Disks), for example. A host computer ('host', hereinbelow) accesses a logical storage region provided by a storage device that performs data reading/writing. A data transfer between a host and a storage device is executed in packet units. The packet size can be established as an integer multiple of a unit that can be read/written by means of a single access operation with respect to an access target volume (Japanese Patent Application Laid Open No. H5-242006).

Although the technology described in this document establishes the packet size between the storage device and host, the packet size within the storage device is in no way considered. For example, write data that is inputted from the host to the storage device, for example, is transmitted internally from a host interface to a disk drive interface and is then written from the disk drive interface to each disk drive. Conversely, read data that is read from each disk drive is transmitted internally from the disk drive interface to the host interface and then transferred from the host interface to the host.

Therefore, although a data transfer can also be made by using packets within the storage device, the packet size within the storage device is fixed in the same way. That is, the packet size in the storage device is fixed to suit the fastest communication environment irrespective of the communication environment (communication band or the like) between the storage device and the host.

Therefore, because packet sizes are different outside and inside the storage device, efficiency in cases where data switching is performed between these external packets is reduced and there is therefore a drop in the data transfer efficiency of the storage device.

In the case of a storage device, a variety of types of hosts known as so-called mainframe system hosts, open system hosts, and the like, for example, can be connected. Each of these hosts performs a data transfer with a storage device in accordance with the respective communication protocol of each host. Therefore, the communication environment between each of these types of hosts and the storage device differs from one type of host to the next. In cases where the packet size that is used in exchanges between the host and the storage device matches or is substantially equal to the packet size within the storage device, the data can be moved rapidly between internal and external packets. However, in cases where the internal and external packet sizes differ greatly, the data transfer efficiency drops.

Therefore, in the case of a storage device to which a variety of types of hosts can be connected at the same time, there is the possibility of a large discrepancy in the communication environment depending on the types of hosts. However, in the prior art, no consideration was paid to the diversity of the communication environments between such hosts and storage devices and the packet size within the storage device was set as fixed without variation.

Similar problems can arise between storage devices and memory drives. The data processing speed and so forth of memory drives differs according to the type. However, because a packet size that is fixed without variation has been used conventionally irrespective of the type of memory drive, there is a margin for improving the data transfer efficiency between memory drives and storage devices.

SUMMARY OF THE INVENTION

Therefore, an object of the present invention is to provide a storage device and method for controlling the packet size of a storage device that allows the data transfer efficiency to be improved by establishing conformity between the packet sizes used in exchanges between storage devices and host devices with the packet sizes used within the storage devices by controlling variably the packet sizes within the storage device in accordance with the given communication environment. A further object of the present invention is to provide a storage device and method for controlling the packet size of a storage device to improve the data transfer efficiency in the storage device by controlling variably the size of a first packet in exchanges between an upper level interface control unit and a memory unit in accordance with the type of communication protocol used by a host device and controlling variably the size of a second packet in exchanges between a lower level interface control unit and a memory unit in accordance with the type of memory drive. Further objects of the present invention will become evident from the following description of the embodiments.

In order to achieve the above object, the storage device according to the present invention comprises an upper level interface control unit that controls data exchanges with a host device; a lower level interface control unit that controls data exchanges with a memory drive; and a memory unit that is shared by the upper level interface control unit and the lower level interface control unit, wherein the upper level interface control unit variably sets a CHA packet size that is used in exchanges with the memory unit in accordance with the communication environment of the upper level interface control unit with the host device.

The upper level interface control unit is able to variably set the CHA packet size on the basis of the type of communication protocol that is used in exchanges with the host device. The upper level interface control unit is also able to variably set the CHA packet size on the basis of the type of access by the host device and the type of communication protocol that is used in exchanges with the host device.

For example, the upper level interface control unit is able to set the CHA packet size relatively large upon judging that data exchanges with the host device are relatively fast and set the CHA packet size relatively small upon judging that data exchanges with the host device are relatively slow, on the basis of the type of communication protocol that is used in exchanges with the host device.

Furthermore, for example, the storage device further comprises a packet size management information storage unit that stores CHA packet size management information for which the CHA packet size is preset for each of the communication protocols of a plurality of types that can be used in exchanges with the host device, wherein the upper level interface control unit is able to judge the type of communication protocol that is used in exchanges with the host device and, by referencing the CHA packet size management information, read and set the CHA packet size suited to the communication protocol type thus judged.

As the upper level interface control unit, the lower level interface control unit is able to variably set a DKA packet size that is used in data exchanges with the memory unit in accordance with the type of the memory drive. For example, the lower level interface control unit is able to set the DKA packet size relatively large when it is judged that the memory drive type is a relatively high performance memory drive and is able to set the DKA packet size relatively small when it is judged that the memory drive type is a relatively low performance memory drive.

At least some of the means, functions and steps of the present invention can sometimes be constituted as a computer program that is read and executed by a microcomputer. A computer program of this kind can be secured on a storage medium such as a hard disk or optical disk, for example, and then distributed. Alternatively, the computer program can be supplied via a communication network such as the Internet.

BRIEF DESCRIPTION OF THE DRAWINGS

FIG. 5 is an explanatory view of an example of a CHA packet size management table;

FIG. 12 is an explanatory view of an example of the DKA packet size management table;

FIG. 17 is an explanatory view illustrating a case where a different packet size management table is prepared for each command type.

DESCRIPTION OF THE SPECIFIC EMBODIMENTS

Figure 1:
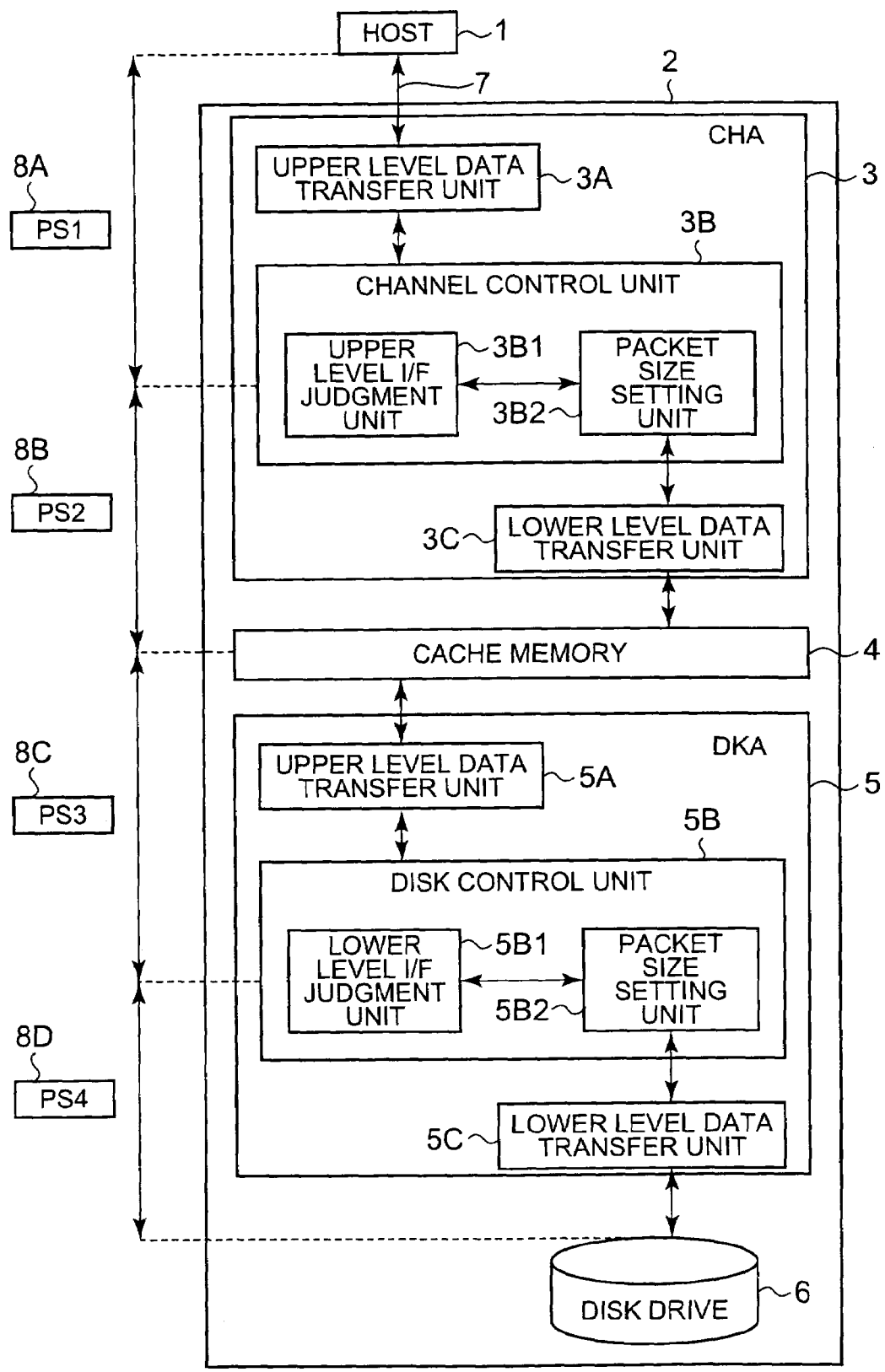
FIG. 1 is an explanatory view illustrating the concept of the embodiment of the present invention.

An embodiment of the present invention will be described below on the basis of the drawings. FIG. 1 is an explanatory view to illustrate the overall concept of this embodiment. This embodiment discloses storage devices 2 each comprising CHA (channel adapters) 3 of a plurality of types that control, in accordance with communication protocols used by hosts 1 of a plurality of types, data exchanges between each host 1, a plurality of DKA (disk adapters) 5 that each control data exchanges with disk drives 6 of a plurality of types, and a cache memory 4 and shared memory that are used by each CHA 3 and each DKA 5 (see FIG. 2).

Further, each CHA 3 comprises an upper level data transfer unit 3A that controls data exchanges with the host 1 to which the upper level data transfer unit 3A is connected on the basis of a predetermined communication protocol, a lower level data transfer unit 3C that executes data exchanges with the cache memory 4 via a CHA packet PS2, and a channel control unit 3B provided between the upper level data transfer unit 3A and the lower level data transfer unit 3C that controls data transfers between the upper level data transfer unit 3A and the lower level data transfer unit 3C.

When accepting access by the host 1, the upper level data transfer unit 3A notifies the channel control unit 3B of the type of communication protocol that is used in exchanges with the host 1 and the channel control unit 3B establishes the size of the CHA packet PS2 suited to the type of communication protocol on the basis of the notification from the upper level data transfer unit 3A. The lower level data transfer unit 3C performs data exchanges with the cache memory 4 in accordance with the size of the CHA packet PS2 thus established by the channel control unit 3B.

Meanwhile, each DKA 5 comprises a lower level data transfer unit (disk drive data transfer unit) 5C that controls data exchanges with a disk drive 6 to which the lower level data transfer unit 5C is connected, an upper level data transfer unit (cache memory data transfer unit) 5A that executes data exchanges with the cache memory 4 via a DKA packet PS3, and a disk control unit 5B provided between the lower level data transfer unit 5C and the upper level data transfer unit 5A that controls data transfers between the lower level data transfer unit 5C and the upper level data transfer unit 5A.

Further, in cases where data from the disk drive 6 is inputted, the lower level data transfer unit 5C relays information specifying the type of the disk drive 6 to the disk control unit 5B, the disk control unit 5B establishes the size of the DKA packet PS3 suited to the type of the disk drive 6 on the basis of the notification from the lower level data transfer unit 5C, and the upper level data transfer unit 5A performs data exchanges with the cache memory 4 in accordance with the size of the DKA packet PS3 thus established by the disk control unit 5B.

Each of the above configurations will now be described in more detail. A variety of hosts 1 can be connected to the storage device 2. The hosts 1 can be broadly classified into so-called open system hosts and mainframe system hosts, for example. As an open system host, for example, a server machine on which a generic OS (Operating System) such as Windows (registered brand name) or UNIX (registered brand name) is installed that accesses the storage device 2 via a relatively generic communication protocol such as FC (Fibre Channel), iSCSI (Internet SCSI), or TCP/IP (Transmission Control Protocol/Internet Protocol) can be cited. As a mainframe system host, for example, a mainframe machine that accesses the storage device 2 via a communication protocol such as FICON (Fibre Connection: registered brand name), ESCON (Enterprise System Connection: registered brand name), ACONARC (Advanced Connection Architecture: registered brand name) or FIBARC (Fibre Connection Architecture: registered brand name) can be cited. The host 1 is connected to CHA 3 of the storage device 2 via a communication network 7 that can comprise metal cable or optical fiber cable and a switch or the like, for example. Although only one host 1 is illustrated in FIG. 1, hosts of different types can actually be connected to the storage device 2. In other words, the storage device 2 is able to supply individual storage services to hosts 1 of a plurality of types.

The storage device 2 can be constituted comprising a plurality of CHA 3 (only one is illustrated), a cache memory 4, a plurality of DKA 5 (only one is illustrated), a plurality of disk drives 6 (only one is illustrated), and a shared memory (not illustrated), as mentioned earlier. Further, with regard to the constitution beyond the scope of FIG. 1, a single or a plurality of controllers that implement(s) the functions of the CHA3 and DKA5 may be provided and data communications between the hosts 1 and disk drives 6 may be controlled by these controllers.

A CHA 3 can be provided for each type of host 1 for example, such as mainframe system hosts CHA or open system hosts CHA. However, CHAs 3 are not limited to such hosts. In a case where one CHA supports a plurality of communication protocols, hosts of different types can also be connected to a single CHA.

The CHA 3 can be constituted comprising an upper level data transfer unit 3A, a channel control unit 3B, and a lower level data transfer unit 3C, for example. The upper level data transfer unit 3A controls data transfers with the host 1 in accordance with the communication protocol used by the host 1. Data is exchanged via a predetermined packet PS1 between the host 1 and upper level data transfer unit 3A. The lower level data transfer unit 3C controls data transfers with the cache memory 4. The lower level data transfer unit 3C exchanges data with the cache memory 4 via the CHA packet PS2.

The channel control unit 3B controls the overall operation of the CHA 3. The channel control unit 3B can comprise an upper level interface ('I/F' hereinbelow) judgment unit 3B1 and a packet size setting unit 3B2, for example. The upper level I/F judgment unit 3B1 judges the type of communication protocol used by the host 1 on the basis of input data from the upper level data transfer unit 3A and notifies the packet size setting unit 3B2 of the judgment result, for example. The packet size setting unit 3B2 sets the size of the CHA packet PS2 on the basis of the communication protocol that is specified by the upper level I/F judgment unit 3B1. The size of the CHA packet PS2 is set in accordance with the type of communication protocol used in exchanges with the host 1. As a result, conformity is established between the size of the CHA packet PS2 and the size of the host packet PS1, which is the counterpart of the CHA packet PS2.

Here, packet size conformity means that a data transfer between packets PS1 and PS2 is performed comparatively smoothly as in a case where there is a substantial match between respective packet sizes or when the sizes are related by a multiple of two or less, for example. In a case where there is a substantial match between the internal and external packet sizes, the packet PS2 can be transferred to and stored in the cache memory 4 immediately after data is shifted from the external packet PS1 to the internal packet PS2. Conversely, immediately after data is shifted from the internal packet PS2 to the external packet PS1, the external packet PS1 can be sent to the host 1. When the size of the internal packet PS2 is an n (n>1) multiple of the size of the external packet PS1, time is required to shift data between the packets PS1 and PS2 and the data transfer efficiency drops. However, cases where n is two or less or a drop in the data transfer efficiency is allowed, for example, may also be considered.

The cache memory 4 stores write data that is written from the host 1, read data that is read to the host 1, and so forth. The CHA 3 and DKA 5 are able to independently and asynchronously access the cache memory 4.

The DKA 5 can be constituted comprising the upper level data transfer unit 5A, the disk control unit 5B, and the lower level data transfer unit 5C, for example. The upper level data transfer unit 5A controls data transfers with the cache memory 4. Data is exchanged between the cache memory 4 and DKA 5 via the DKA packet PS3. The lower level data transfer unit 5C controls data transfers with the disk drive 6. Data is exchanged between the disk drive 6 and DKA 5 via a packet PS4.

The disk control unit 5B controls the overall operation of the DKA 5. The disk control unit 5B can comprise a lower I/F judgment unit 5B1 and a packet size setting unit 5B2. The lower I/F judgment unit 5B1 judges the type of the disk drive 6 on the basis of the input data from the lower level data transfer unit 5C and notifies the packet size setting unit 5B2 of the judgment result, for example. The packet size setting unit 5B2 then sets the size of the DKA packet PS3 in accordance with the type of the disk drive 6. That is, the packet size setting unit 5B2 establishes conformity between the size of the packet PS4 that is used in exchanges with the disk drive 6 and the size of the DKA packet PS3 that is used in exchanges with the cache memory 4.

The disk drive 6 is a memory drive such as a hard disk drive, an optical disk drive, a magneto-optical disk drive, or a semiconductor memory drive, for example. Although there are also differences that depend on the RAID constitution, a single group is constituted by a plurality of three or four disk drives 6, for example.

1. First Embodiment Example

Figure 2:
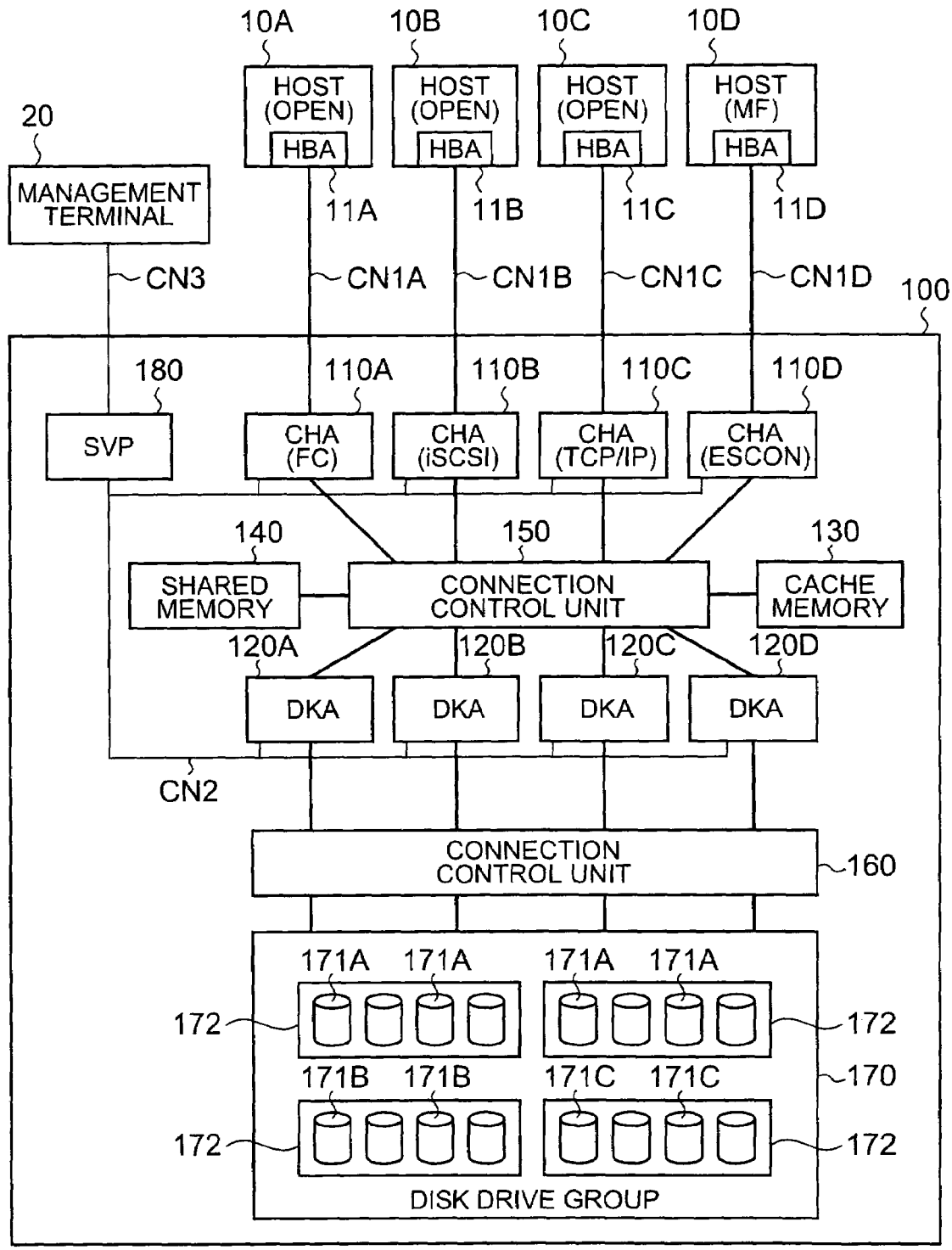
FIG. 2 is a block diagram in which the focus is on the hardware constitution of the storage device.

FIG. 2 is a block diagram in which the focus is on the functional constitution of a storage device 100. The storage device 100 can be connected to a plurality of hosts 10A to 10D via communication networks CN1A to CN1D respectively.

The hosts 10A to 10D (hereinafter 'host 10' when no particular distinction is required) comprise HBA (Host Bus Adapters) 11A to 11D. Each of the hosts 10A to 10D is connected to corresponding CHA 110A to 110D respectively via respective HBA 11A to 11D. Further, in FIG. 2, although each of the hosts 10 is shown provided with one HBA each, in actuality, each of the hosts 10 can be provided with a plurality of HBA. Further, when a path control program is installed on each host 10, control can be executed by means of the path control program to use any of the plurality of HBA and, as a result, load dispersion and fault avoidance, and so forth, can be executed.

For example, the hosts 10A to 10C are open system hosts and the other host 10D is a mainframe system host. The host 10A performs data transfers on the basis of the Fibre Channel protocol (FC), for example. The host 10B performs data transfers on the basis of iSCSI, for example. The host 10C performs data transfers on the basis of TCP/IP, for example. Further, as these open system hosts 10A to 10C, server machines, personal computers, work stations, portable information terminals, and the like, can be cited, for example. On the other hand, the mainframe system host 10D performs data transfers on the basis of ESCON, for example. In addition, there are cases where the mainframe system host performs a data transfer with the storage device 100 via a special protocol other than FICON, ACONARC, FIBARC, and so forth. Each host can be connected with a plurality of client terminals located outside the figure via another communication network and is able to provide information processing services to each of these client terminals.

A management terminal 20 is a device for collecting a variety of information on the storage device 100 via a service processor (SVP) 180 (described subsequently) that serves to supply the required instructions to the storage device 100. The management terminal 20 is connected to the SVP 180 via a communication network CN3 such as a LAN (Local Area Network), for example. The management terminal 20 comprises a GUI (Graphical User Interface) based on a Web browser, for example, and collects a variety of information and inputs instructions by logging onto a WWW (World Wide Web) server provided by the SVP 180.

The storage device 100 comprises a plurality of CHA 110A to 110D (hereinafter 'CHA 110' where no particular distinction is made), a plurality of DKA 120A to 120D (hereinafter 'DKA 120' where no particular distinction is made), a cache memory 130, a shared memory 140, respective connection control units 150 and 160, a storage unit 170, and an SVP 180.

The storage device 100 can be provided with a plurality of CHA 110. Each CHA 110 is a special package for controlling data transfers with each host 10. The details on the CHA 110 will be described further subsequently. However, each CHA 110 comprises a plurality of communication ports and can be connected to at least one or more hosts 10. Each CHA 110 individually controls data transfers with the host 10. In the example illustrated in FIG. 2, the CHA 110A controls data transfers with the host 10A on the basis of the Fibre Channel protocol. The CHA 110B controls data transfers with the host 10B on the basis of iSCSI. The CHA 110C controls data transfers with the host 10C on the basis of TCP/IP. Further, by installing a file management program or the like on the CHA 110C, a NAS (Network Attached Storage) function can be implemented. The CHA 110D controls data transfers with the mainframe system host 10D on the basis of ESCON.

The storage device 100 can comprise a plurality of DKA 120. Each DKA 120 controls data transfers with the storage unit 170. Each DKA 120 accesses each disk drive 171 by converting a logical block address (LBA) designated by the host 10 into a physical disk address, for example, and performs data reading or data writing. Details on the DKA 120 will be provided subsequently.

The cache memory 130 stores write data that is written from the host 10 and read data that is read to the host 10. The cache memory 130 can be constituted by a volatile or nonvolatile memory, for example. When the cache memory 130 is constituted comprising a volatile memory, a memory backup is preferably executed by means of a battery supply (not shown). Further, although not illustrated, the cache memory 130 can be constituted by two regions that are a read cache region and a write cache region and data stored in the write cache region can be multiplexed and stored. That is, read data for which the same data also exists on the disk drive 171 need not be multiplexed because, even if this data is lost, same need only be reread from the disk drive 171. On the other hand, because write data exists only in the cache memory 130 within the storage device 100, such write data is preferably multiplexed and stored from the point of view of reliability. However, whether cache data is multiplexed and stored depends on the specification.

The shared memory (also called the control memory) 140 can be constituted by nonvolatile memory, for example, but may also be constituted by volatile memory. Control information, management information, and the like, for example, is stored in the shared memory 140. Information such as this control information can be multiplexed and managed by a plurality of memories 140.

The shared memory 140 and cache memory 130 can be constituted as separate memory packages or the cache memory 130 and shared memory 140 may be provided in the same memory package. Further, a portion of the memory can be used as cache memory, while another portion is used as the control region. That is, the shared memory and cache memory can also be constituted as the same memory.

The CHA/DKA connection control unit (switch portion) 150 can mutually connect each CHA 110, each DKA 120, the cache memory 130, and the shared memory 140. Accordingly, all the CHA 110 and DKA 120 are able to access individually the cache memory 130 and shared memory 140. The connection control unit 150 can be constituted as an ultra-high-speed crossbar switch or the like, for example. The connection control unit 160 of the disk drive connects each DKA 120 and the storage unit 170.

The storage unit 170 is constituted comprising a multiplicity of disk drives 171. The storage unit 170 can provide the controller parts of the respective CHA 110 and respective DKA 120 in the same housing or can provide the controller parts in a separate housing.

Disk drives 171A to 171C of a plurality of types can be mixed together in the storage unit 170 ('disk drives 171' when no particular distinction is made). For example, the first disk drive 171A is an FC disk (Fibre Channel disk). Further, for example, the second disk drive 171B is a SCSI (Small Computer System Interface) disk. In addition, for example, the third disk drive 171C is a SATA (Serial AT Attachment) disk. The types of disks are not limited to the aforementioned types.

Here, data processing performance generally drops in the order FC disk, SCSI disk, and then SATA disk. Recently, the FC disk has afforded the highest data processing performance. Data processing performance can include IOPS (input/output per second) performance, MB per second performance, data access times, and so forth. For example, FC disks, which are highly reliable high performance disks, are used in cases where mission-critical data must be accessed at high speeds, and SATA disks, which do not possess as high a performance as FC disks, are used for saving archive data for which high-speed access and the like is not required.

In the case of the storage device 100 of this embodiment, disk drives 171A to 171C of multiple types can be mixed and usage that is suited to the characteristics of the respective disk drives 171A to 171C is thus possible.

The storage unit 170 can comprise a plurality of RAID groups 172. Each RAID group 172 is constituted by physical disks 171 of the same type. That is, a certain RAID group 172 is constituted by only the FC disks 171A, while the other RAID group 172 is constituted by SATA disks 171C. Further, a certain RAID group 172 is constituted by only SCSI disks 171B. Further, the logical storage region provided by each RAID group 172 can comprise at least one or more logical volumes (LU: Logical Unit) Each host 10 accesses the logical volume and writes or reads data. Further, the access target volume of the open system hosts 10A to 10C is an LU and the access target volume of the mainframe system host 10D is a logical device (LDEV).

Further, all of the storage resources used by the storage device 100 need not exist in the storage device 100. The storage device 100 is also able to incorporate and utilize the storage resources that exist outside the storage device 100 as if these resources were its own storage resources. That is, for example, the storage device 100 can directly connect to an externally installed proprietary storage device or to another company's storage device (not shown) via a SAN (Storage Area Network) or the like without the involvement of the host 10. Further, the storage device 100 is able to incorporate an external logical volume by mapping a logical volume of an external storage device with its own LU, LDEV or intermediate volume.

The SVP 180 is connected to each CHA 110 and each DKA 120 via an internal network CN2 such as a LAN. The SVP 180 collects a variety of states within the storage device 100 and processes such states or leaves these states as is before supplying these states to the management terminal 20.

Figure 3:
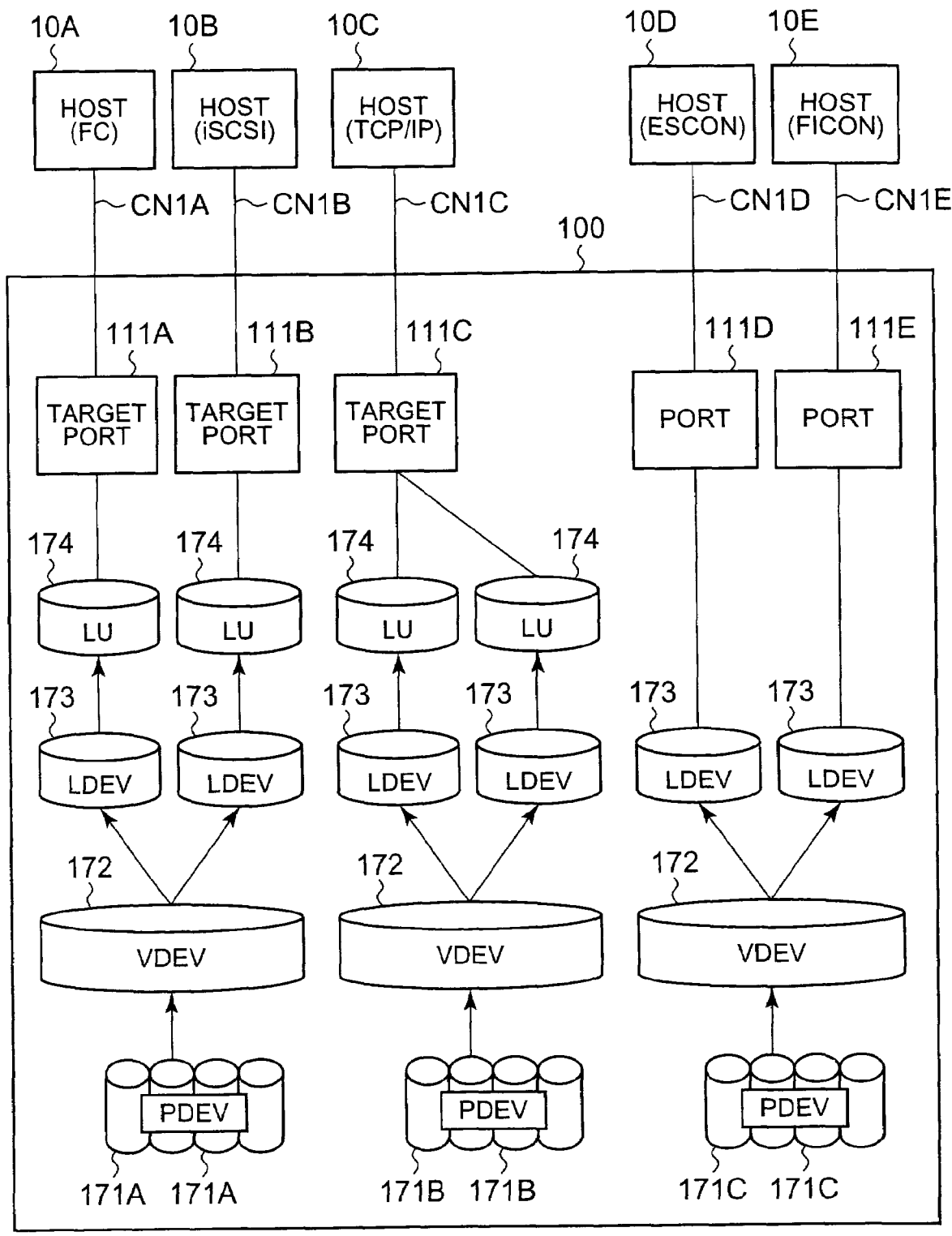
FIG. 3 is an explanatory view in which the focus is on the logical constitution of the storage device.

FIG. 3 is an explanatory view of a constitution in which the focus is on the storage constitution of the storage device 100. The storage structure of the storage device 100 can be constituted by PDEVs (Physical Devices) 171, which are physical disks, VDEVs (Virtual Devices) 172, which are virtual storage regions provided by a plurality of grouped PDEV 171, and LDEVs (Logical Devices) 173 that are established in the VDEVs 172. Here, the PDEVs 171 correspond to the disk drives 171 in FIG. 2 and the VDEV 172 correspond to the RAID groups 172 in FIG. 2.

Here, a LUN (Logical Unit Number) is allocated to each of several logical volumes (LDEV) that are identified as LU 174 by the open system hosts 10A to 10C. The open system hosts 10A to 10C access the logical volumes (LU 174) for which is access rights via target ports 111A to 111C. The target ports 111A to 111C are communication ports provided by each CHA 110 in FIG. 2. On the other hand, the mainframe system hosts 10D and 10E access respective LDEV 173 for which is access rights via ports 111D and 111E respectively.

Figure 4:
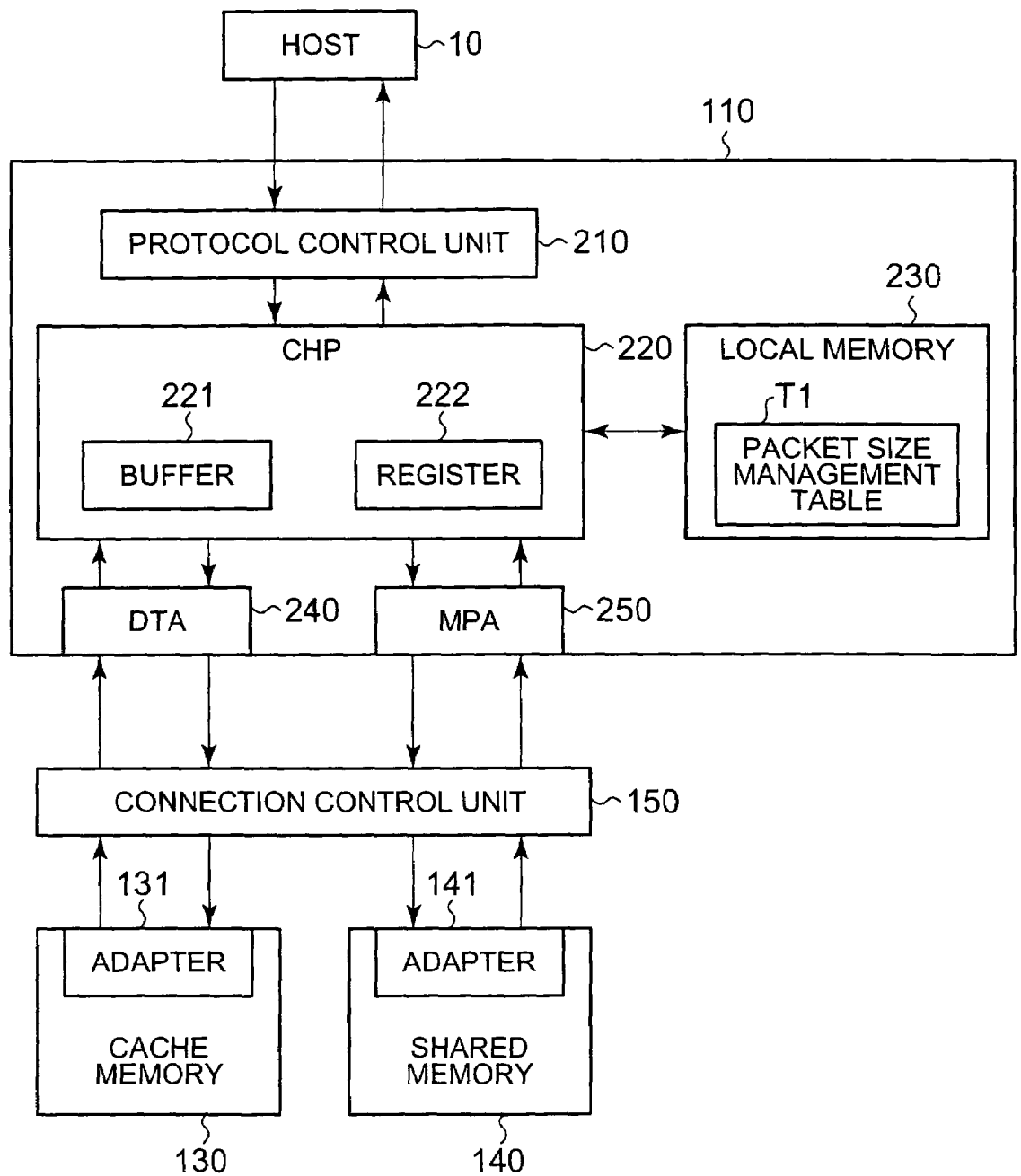
FIG. 4 is a block diagram illustrating the schematic constitution of the CHA periphery.

FIG. 4 is schematic block diagram of the CHA 110 in FIG. 2. The CHA 110 can comprise a protocol control unit 210, a CHP (Channel Processor) 220, a local memory 230, a DTA (Data Adapter) 240 and an MPA (MicroProgram Adapter) 250, for example.

The protocol control unit 210 is a circuit that sends and receives packet data on the basis of a predetermined communication protocol. The CHP 220 is a circuit that governs the overall operation of the CHA 110 and comprises a buffer 221 and a register 222. The local memory 230 stores control information that is to be supplied to the CHP 220, or the like. All or a predetermined portion of a packet size management table T1 (described subsequently), for example, is stored in the local memory 230. As will be mentioned subsequently, the CHP 220 determines the packet size used in exchanges with the cache memory 130 by referencing the packet size management table T1 on the basis of data that is inputted by the protocol control unit 210. The packet size thus determined is then stored in the register 222.

The cache memory 130 comprises an adapter 131 for performing data transfers with the outside. Likewise, the shared memory 140 comprises an adapter 141 for performing data transfers with the outside.

The DTA 240 exchanges data with the cache memory 130 via the connection control unit 150. The DTA 240 reads data stored in the buffer 221 a predetermined amount at a time on the basis of the packet size set in the register 222 and then transfers this data to the cache memory 130. Further, the DTA 240 reads data from the cache memory 130 a predetermined amount at a time on the basis of the packet size that has been set in the register 222 and then stores this read data in the buffer 221. The data stored in the buffer 221 is read a predetermined amount at a time by means of a packet size that is prescribed by the communication protocol used by the host 10 and then sent to the host 10 by means of the protocol control unit 210.

The MPA 250 exchanges data with the shared memory 140 via the connection control unit 150. The MPA 250 writes a command received from the host 10 to the shared memory 140. Further, the CHP 220 obtains information on the state of the progress of the command processing by referencing the shared memory 140 as required via the MPA 250. Further, the CHP 220 is able to synchronize control information that is stored in the local memory 230 with control information that is stored in the shared memory 140 via the MPA 250. For example, the portion that is required by each CHA 110 of the control information stored in the shared memory 140 is stored in the packet size management table T1 in the local memory 230 of each CHA 110. The table that is stored in each local memory 230 and the table (reference table) that is stored in the shared memory 140 can be synchronized at regular intervals or as required.

FIG. 5 is an explanatory view of an example of the CHA packet size management table T1 that is used by each CHA 110. The CHA packet size management table T1 can be constituted to include item numbers, protocol types, bandwidth, and packet sizes, for example. Communication protocol types can be broadly classified into the mainframe system protocols PA and PB and the open system protocols PC, PD, and PE, for example. As mentioned earlier, ESCON, FICON, and so forth, for example, are known as mainframe system protocols. Further, as mentioned earlier, FIBRE, iSCSI and NAS (TCP/IP) and so forth, for example, are known as open system protocols. Further, the individual specifications such as bandwidth are sometimes different even with the same communication protocol. Therefore, in this embodiment example, management of the packet size extends as far as including the bandwidth of each protocol type. For example, even with the same type of protocol PC, 1 Gbps and 2 Gbps cases are identified as different types of communication protocol and the corresponding packet sizes are preset in the packet size management table T1.

Further, instead of showing packet sizes for specific protocols that have been specified, FIG. 5 shows an aspect in which the size of an external packet is set variably in accordance with the type of protocol.

As one example, a packet size of approximately 800 bytes can be preset for a mainframe system protocol PA for the communication band 200 Mbps, for example. Further, for the other mainframe system protocol PB, a packet size of about 4 k bytes can be preset in a case where the communication band is 1 Gbps and a packet size of about 8 k bytes can be preset for a case where the communication band is 2 Gbps, for example.

Where the open system protocol PC is concerned, a packet size of about 4 k bytes can be preset for a 1 Gbps case, a packet size of about 8 k bytes can be preset for a 2 Gbps case, a packet size of about 16 k bytes can be preset for a 4 Gbps case, and a packet size of about 40 k can be preset for a 10 Gbps case, for example.

In addition, supposing that the communication band of another open system protocol PD is 1.25 Gbps, a packet size of about 4 k bytes can be preset, for example. Further, supposing that the communication band of yet another open system protocol PE is 1.25 Gbps, a packet size of about 4 k bytes can be preset, for example.

Therefore, packet sizes that conform to the respective communication protocols are preset in the CHA packet size management table T1 for each type of communication protocol. In this embodiment, settings are made such that the higher the data communication speed of the communication protocol, the larger the packet size. Further, the numerical values for each bandwidth and each packet size are an illustrative example and the present invention is not limited to these numerical values.

One characteristic of the present invention is the fact that the packet size used in exchanges between the CHA 110 and cache memory 130 is automatically regulated in accordance with the data communication speed between the host 10 and CHA 110. In this embodiment, the values of the CHA packet size management table T1 can be set so that there is conformity between the data communication speed between the hosts 10 and CHA 110 (external data communication speed) and the data communication speed between the CHA 110 and cache memory 130 (internal data communication speed). As one such example, the CHA packet size management table T1 can be constructed so that the packet size used between the host 10 and the CHA 110 and the packet size used between the CHA 110 and cache memory 130 are equal or substantially match one another. Naturally, there is not necessarily a complete match between each of the packet sizes that are used internal and external the storage device 100.

Figure 6:
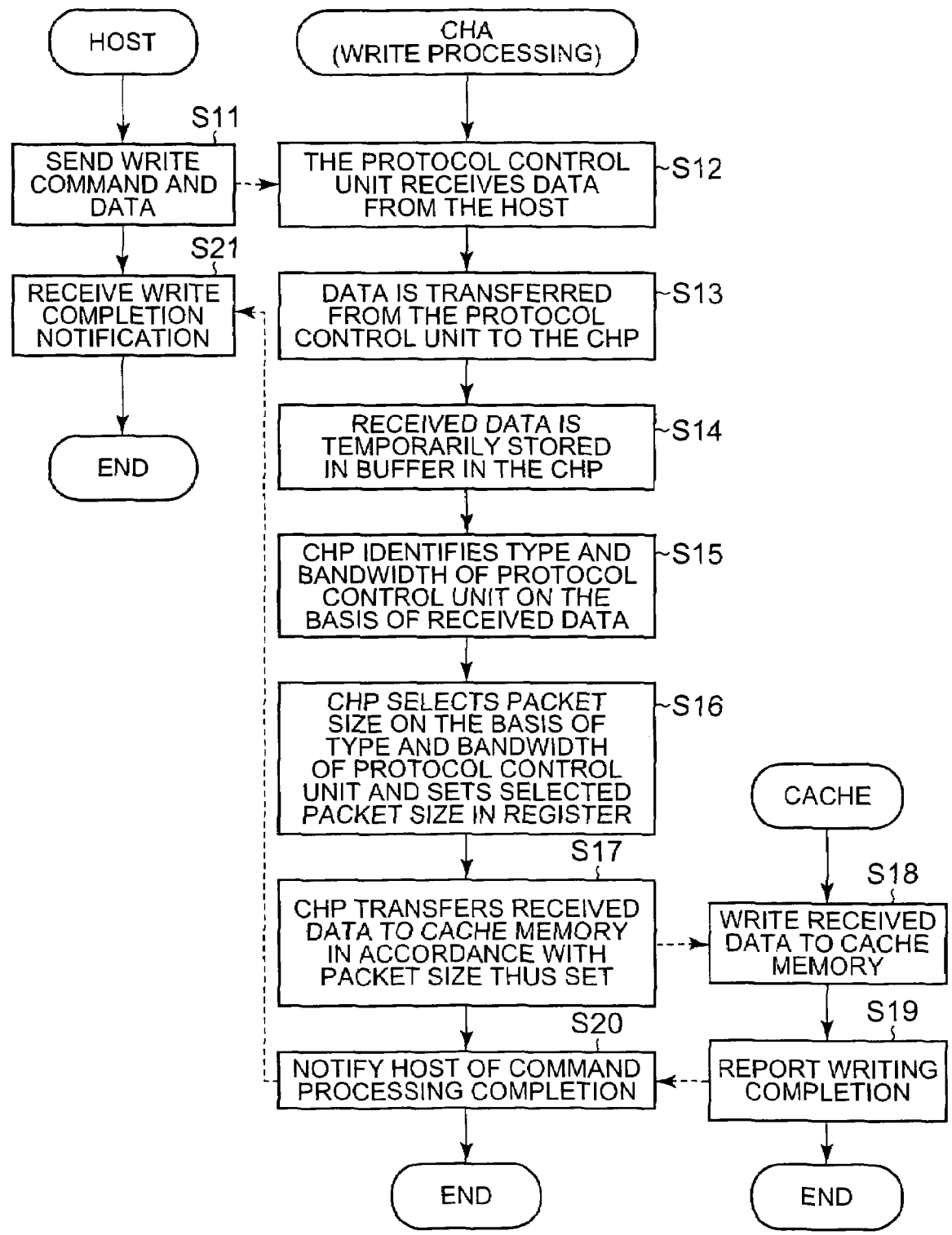
FIG. 6 is a flowchart showing WRITE processing by the CHA.

Next, an outline of the operation of the storage device 100 will be described on the basis of FIGS. 6 and 7. First, FIG. 6 is an outline flowchart for a case where a WRITE command is processed. The host 10 transmits a WRITE command and write data to a specified CHA 110 in accordance with a predetermined communication protocol (S11). Data is thus transmitted from the host 10 to the CHA 110 within a fixed communication band.

The CHA 110 receives the WRITE command from the host 10 via the protocol control unit 210 (S12). The protocol control unit 210 transfers the WRITE command and write data to the CHP 220 in accordance with the communication band used by the host 10 (in accordance with the packet size used by the communication protocol of the host 10) (S13).

Here, the protocol control unit 210 adds information to indicate the type of communication protocol to the header of the write data that is transferred to the CHP 220. The added information can be called protocol type judgment information, for example. The protocol type judgment information can include information indicating the type of the protocol control unit 210 and information indicating the communication band used in exchanges with the host 10 and CHA 110, for example. Information indicating the type of the protocol control unit 210 is information indicating that the protocol control unit 210 is a circuit corresponding to a given kind of communication protocol (ESCON, FIBRE, and so forth).

The CHP 220 temporarily stores the write data that is received from the protocol control unit 210 in the buffer 221 (S14). Further, the CHP 220 reads the header part of the data that is stored in the buffer 221, that is, the protocol type judgment information that has been added by the protocol control unit 210, and thus judges the communication environment with the host 10 (the type of communication protocol and communication band) (S15).

The CHP 220 references the CHA packet size management table T1 on the basis of the communication environment thus identified, reads the preset packet size and sets the packet size thus read in the register 222 (S16).

The CHP 220 reads the data that is stored in the buffer 221 a predetermined amount at a time in accordance with the packet size set in the register 222 and transfers this data to the cache memory 130 from the DTA 240 (S17). Here, there is conformity between the packet size that is transferred from the host 10 to the CHP 220 via the protocol control unit 210 (the external packet size) and the packet size that is transferred from the CHP 220 to the cache memory 130 via the DTA 240 (the internal packet size). Therefore, the shifting of data from an external packet to an internal packet is performed rapidly and the data of packets that reach the CHA 110 is transferred to the cache memory 130 directly. Further, the protocol type judgment information, which is added information, is not transferred to the cache memory 130.

The packet sent from the DTA 240 is sent to the adapter 131 of the cache memory 130 via the connection control unit 150. Here, the connection control unit 150 transmits the packet received from the DTA 240 to the cache memory 130 as is without changing the size of this packet.

The adapter 131 of the cache memory 130 receives the packet from the CHA 110 via the connection control unit 150, retrieves data from the packet and stores the data in a predetermined storage region (S18). When writing to the cache memory 130 is complete, the adapter 131 is able to report completion of writing to the CHA 110 (S19).

Upon receiving the writing completion report from the cache memory 130, the CHA 110 reports the fact that the processing of the WRITE command is complete to the host 10 (S20) The host 10 receives the processing completion report from the CHA 110 (S21). Therefore, at the moment the write data is stored in the cache memory 130, the responsiveness of the storage device 100 can be improved by reporting the completion of processing to the host 10.

Further, the write data thus written to the cache memory 130 is written to a predetermined disk drive 171 by the DKA 120 in a suitable period. The DKA 120 references the shared memory 140 as required, and, upon finding an unprocessed WRITE command in the shared memory 140, reads write data from the cache memory 130. The DKA 120 writes write data to a predetermined disk drive 171 that constitutes the volume 173 designated by the WRITE command. Until the DKA 120 writes write data to a predetermined disk drive 171, write data can be multiplexed and stored in the cache memory 130.

Figure 7:
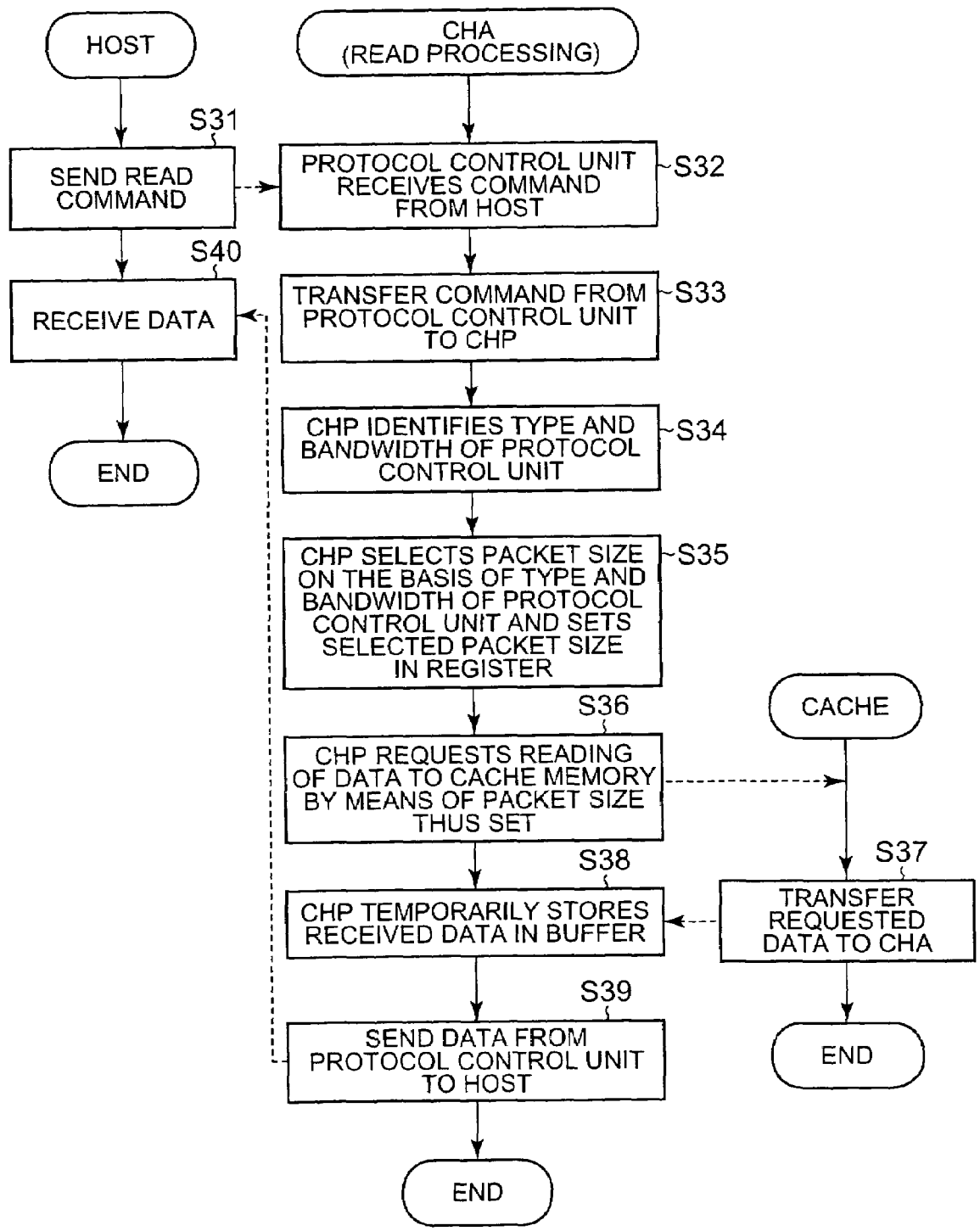
FIG. 7 is a flowchart showing READ processing by the CHA.

Next, FIG. 7 is an outline flowchart for a case where a READ command is processed. First, the host 10 issues a READ command by designating the address of data for which reading is desired (S31)

Upon receiving a READ command from the host 10 (S32), the protocol control unit 210 of the CHA 110 transfers the READ command to the CHP 220 (S33). Here, the protocol control unit 210 adds the protocol type judgment information to the header of the READ command and transfers this information to the CHP 220, for example. As mentioned earlier, the protocol type judgment information includes the type of protocol control unit 210 (which type corresponds with which communication protocol) and information indicating the communication band with the host 10. The CHP 220 specifies the type of communication protocol that is used by the host 10 and the communication band on the basis of the protocol type judgment information thus inputted by the protocol control unit 210 (S34).

The CHP 220 references the CHA packet size management table T1 with the communication protocol and communication band thus specified serving as the search key, reads the packet size conforming with the communication environment with the host 10, and sets the packet size in the register 222 (S35).

The CHP 220 requests the reading of data to the cache memory 130 in accordance with the packet size thus set in the register 222 (S36). The adapter 131 of the cache memory 130 reads the requested data from the cache memory 130 and transfers the data to the CHA 110 by means of the packet size designated in S36 (S37). When the requested data does not exist in the cache memory 130, the requested data is read from the disk drive 171 via the DKA 120 and then stored in the cache memory 130.

Upon acquiring the data from the cache memory 130, the CHP 220 temporarily stores the data in the buffer 221 (S38). The data stored in the buffer 221 is transferred to the host 10 via the protocol control unit 210 (S39). The host 10 receives data in a predetermined packet size (S40).

Because, as stated earlier, this embodiment establishes conformity between the packet size used in exchanges with the host 10 and CHA 110 and the packet size used in exchanges with the CHA 110 and cache memory 130, the data transfer efficiency in the storage device 100 can be raised and hence the processing performance can be improved. The results will now be described with reference to FIGS. 8 to 10.

Figure 8:
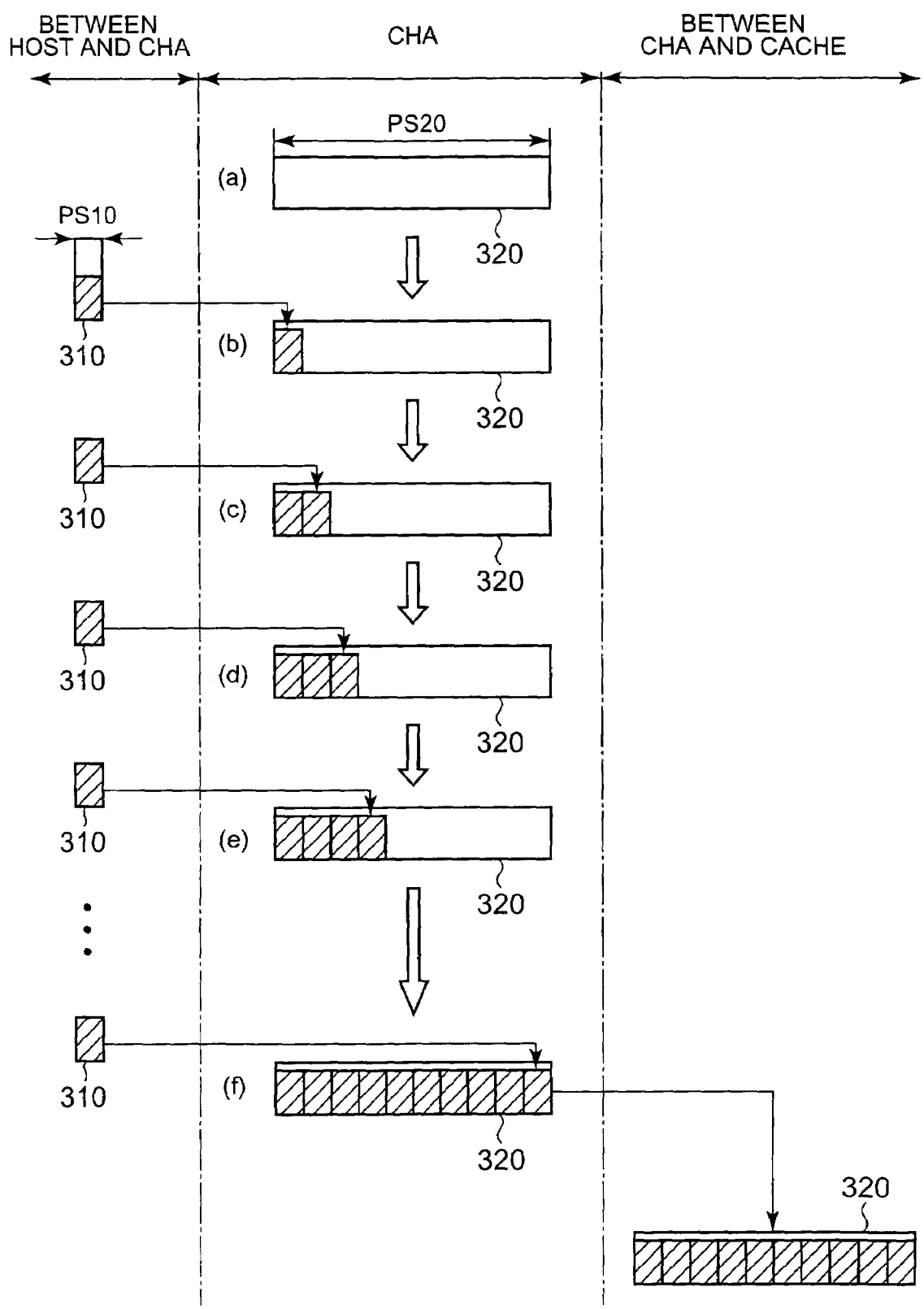
FIG. 8 is an explanatory view that schematically illustrates the appearance of a data transfer in a case where nonconformity exists between packet sizes.

FIG. 8 is an explanatory view illustrating a case where nonconformity exists between size PS10 of a packet 310 used in exchanges with the host 10 and CHA 110 and size PS20 of a packet 320 used in exchanges with the CHA 110 and the cache memory 130. When the packet size PS20 used in exchanges with the CHA 110 and cache memory 130 is fixed, fixing in accordance with the fastest communication protocol may be considered. Hence, the packet size PS20 is set comparatively large.

However, the storage device 100 is connected to hosts 10 of a variety of types such that the communication environment differs in each case. Therefore, in cases where a CHA 110 that has been adjusted in accordance with a high-speed host 10 is connected to a host 10 that performs the slowest data communications, the internal and external packet sizes PS20 and PS10 yield very different results.

Therefore, so too when packets 310 arrive from the host 10, the packet 320 is not transferred to the cache memory 130 until the data retrieved from the packets 310 fills the packet 320. As shown in (a) to (e) in FIG. 8, the packet 320 in the storage device 100 is not transferred until the packet 320 has been filled with a predetermined amount of data by the packets 310 that arrive successively from the host 10. Further, as shown (f) in FIG. 8, when the packet 320 is filled with a predetermined amount of data, the packet 320 is transferred to the cache memory 130 and stored in the cache memory 130.

FIG. 8 shows an example where a WRITE command from the host 10 is processed and the same problem arises as for a case where a READ command is requested. In a case where a READ command is processed, data that is read by means of the large packet size PS20 is transferred to the host 10 a little at a time by means of the small packet size PS10.

Therefore, when the size PS10 of the packet 310 used in exchanges with the host and CHA and the size of the packet 320 used in exchanges with the CHA and cache memory differ greatly, the data transfer is blocked within the CHA 110, and hence the data transfer efficiency is reduced.

Figure 9:
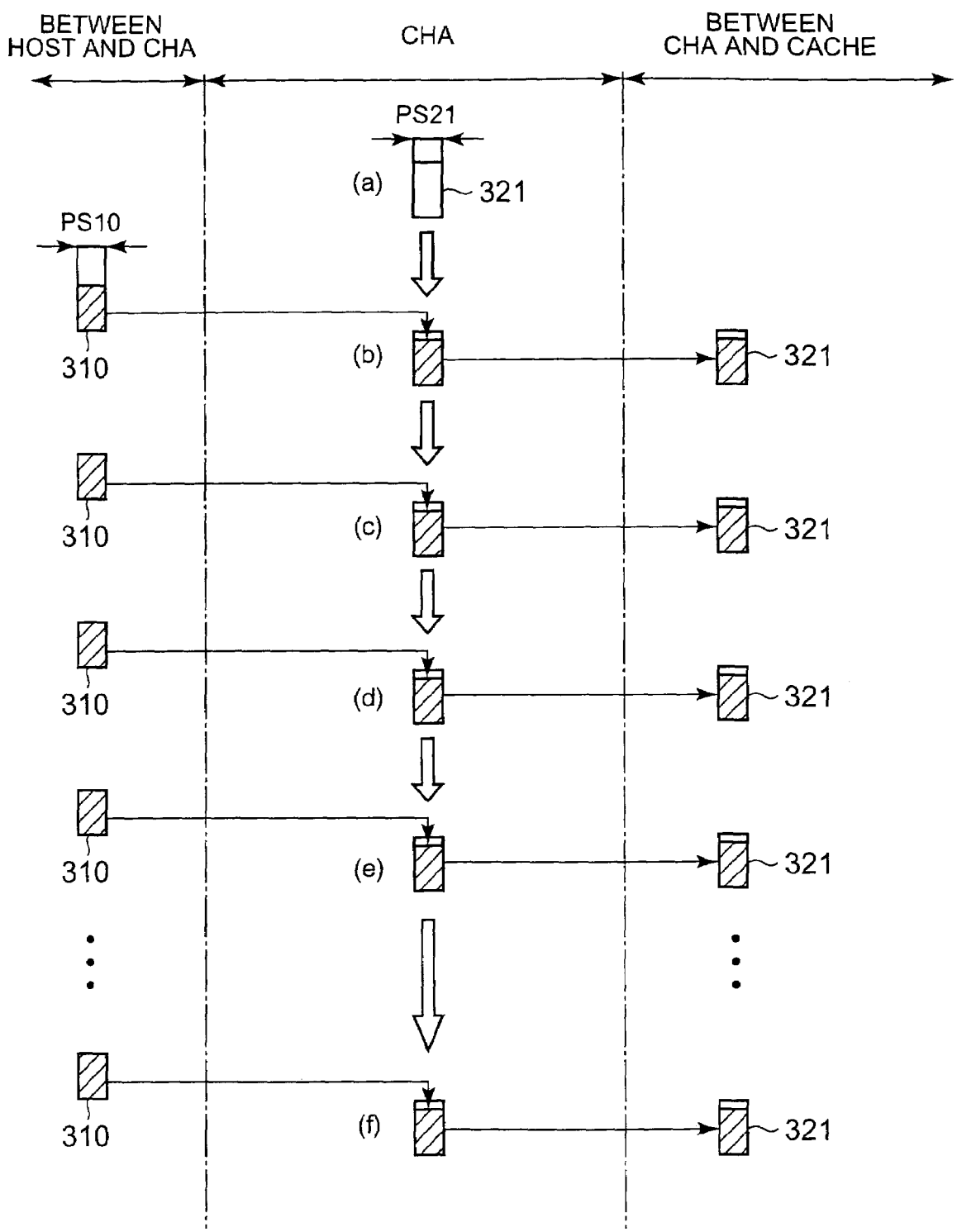
FIG. 9 is an explanatory view that schematically illustrates the appearance of a data transfer from a host to cache in a case where packet size conformity exists.

FIG. 9 is an explanatory view that schematically shows the appearance of the data transfer of this embodiment example. As stated earlier, in this embodiment example, the optimum packet size is requested beforehand in accordance with the communication protocol used by the host 10 and the communication band thereof, and a packet size PS21 that conforms with the packet size used by the host 10 is established.

As shown in (a) in FIG. 9, before the WRITE command from the host 10 is processed, the size PS21 of a packet 321 is established in accordance with the size PS10 of the packet 310 used by the host 10. The PS10 and PS21 are equal or substantially match one another. Therefore, as shown in (b) to (f) in FIG. 9, the data of the packets 310 arriving from the host 10 is shifted to the packet 321 rapidly and immediately sent to the cache memory 130. Therefore, the data transfer can be efficiently performed without packet processing being blocked within the CHA 110.

Figure 10:
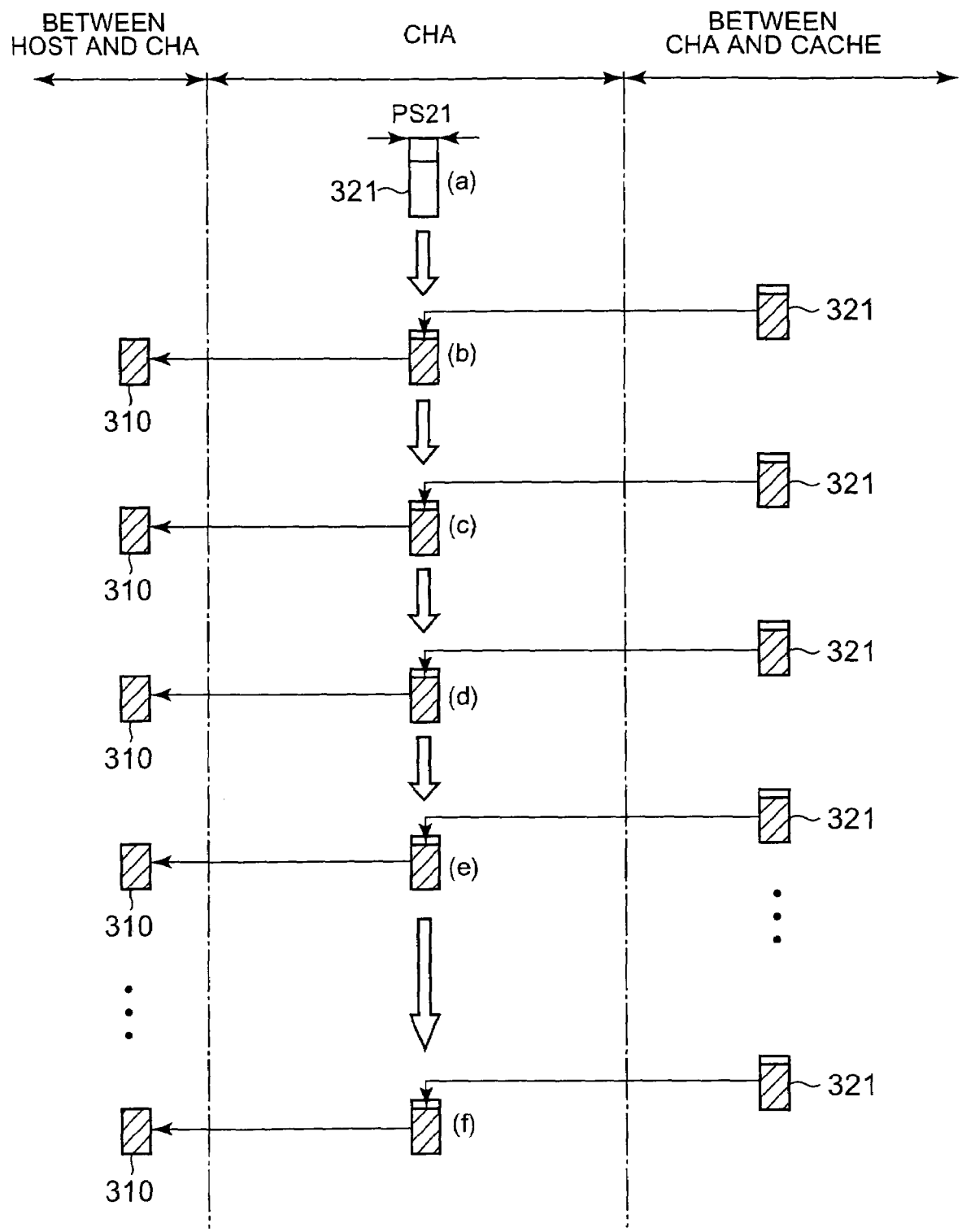
FIG. 10 is an explanatory view that schematically illustrates the appearance of a data transfer from the cache to a host in a case where packet size conformity exists.

FIG. 10 is a schematic diagram for a case where a READ command is processed. As per FIG. 9, there is conformity between the size PS10 of the packet 310 used by the host 10 and the size PS21 of the packet 321 used by the CHA 110 within the storage device 100. Therefore, data that is read from the cache memory 130 via the packet 321 is shifted to the packet 310 rapidly and then sent to the host 10.

Although FIGS. 9 and 10 show a case where the size PS10 of the packet 310 used in exchanges with the host 10 and CHA 110 is relatively small, the present invention is not limited to such a case. When the size PS10 of the packet 310 is relatively large, the size PS21 of the packet 321 that is used within the storage device 100 is accordingly also set large.

In addition to the above results, according to this embodiment example, because the optimum packet size is requested beforehand in accordance with the type of communication protocol used in exchanges with the host 10 and then registered in the CHA packet size management table T1, the optimum packet size can be immediately set simply by specifying the type of communication protocol. Further, the present invention is not limited to such a process. The constitution may be one in which the size of the internal packet 320 is determined by performing a predetermined calculation on the basis of the data transfer speed with the host 10. Further, the constitution may be such that the optimum packet size is constituted by gradually varying the size of the internal packet in stages as per the trial-and-error method.

2. Second Embodiment Example

The second embodiment example of the present invention will now be described on the basis of FIGS. 11 to 16. This embodiment example is characterized in that the packet size used in exchanges with the DKA 120 and cache memory 130 is variably controlled in accordance with the type of the disk drive 171.

Figure 11:
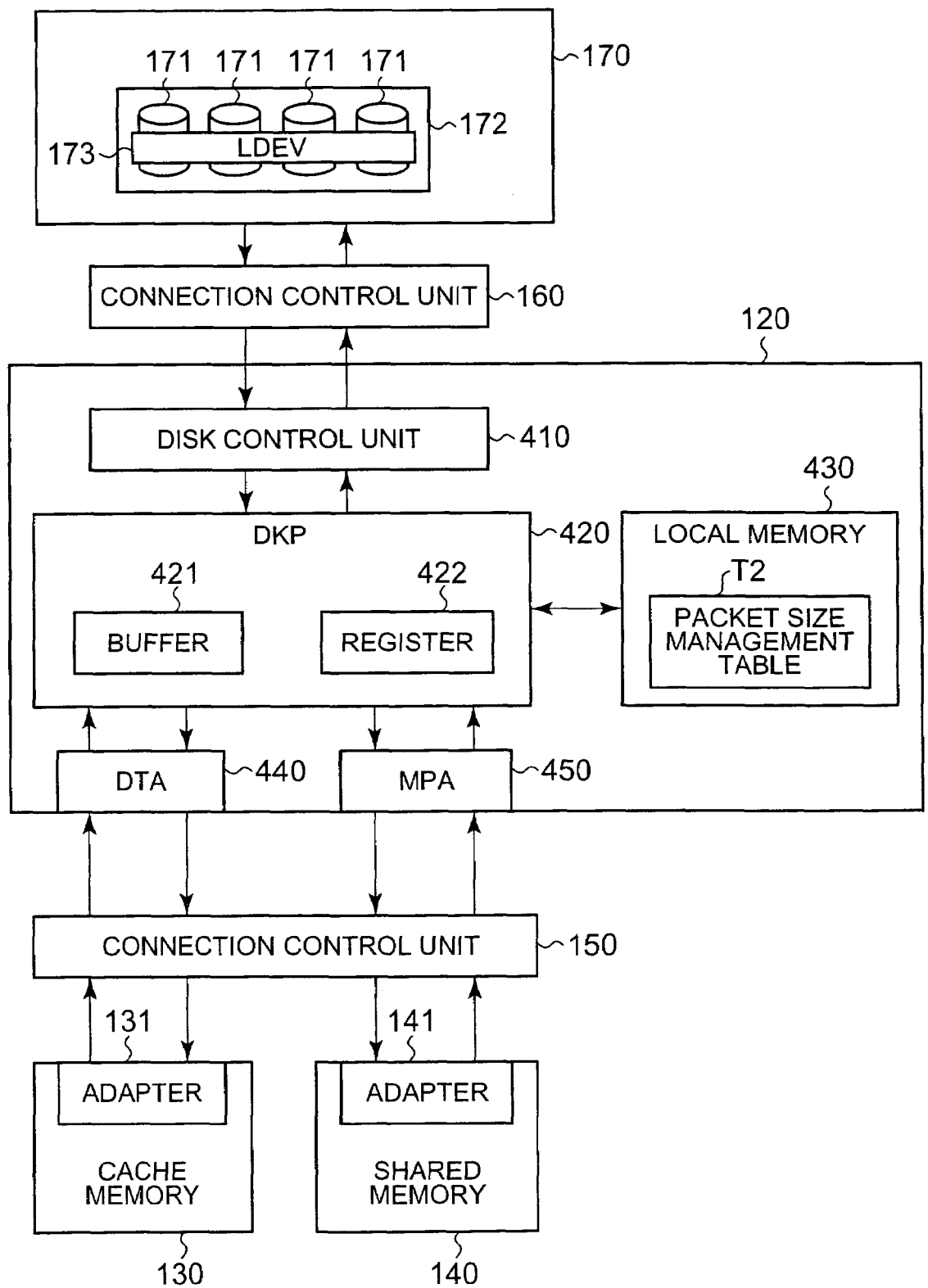
FIG. 11 is a block diagram showing the outline constitution of the periphery of the DKA.

FIG. 11 is a block diagram showing the constitution of the DKA 120. The DKA 120 can be constituted comprising a disk control unit 410, a DKP (Disk Processor) 420, a local memory 430, a DTA 440, and an MPA 450, for example. As will be mentioned subsequently, the DKA 120 has a similar constitution to the CHA 110. Therefore, depending on the case, the CHA function, which governs the data transfer with the host 10 and the DKA function, which governs the data transfer with the disk drive 171, can also be combined in the same control package.

The disk control unit 410 is a circuit that performs data communications with each disk drive 171 of the storage unit 170 via a connection control unit 160. The DKP 420 is a control circuit that governs overall control of the DKA 120 and comprises a buffer 421 and a register 422. The local memory 430 stores control information that is to be supplied to the DKP 420, and so forth. Similarly to the CHA 110, all or a predetermined part of a DKA packet size management table T2 (described subsequently) is stored in the local memory 430.

As will be mentioned subsequently, the DKP 420 determines the packet size used in exchanges with the cache memory 130 by referencing the packet size management table T2 on the basis of data that is inputted by the disk control unit 410. The packet size thus determined is stored in the register 422. A data transfer between the DKA 120 and cache memory 130 is performed in accordance with the packet size set in the register 422.

The DTA 440 performs a data transfer with the cache memory 130 via the CHA/DKA connection control unit 150. The DTA 440 reads the data that is stored in the buffer 421 a predetermined amount at a time on the basis of the packet size set in the register 422 and then transfers this data to the cache memory 130. Further, the DTA 440 reads data a predetermined amount at a time from the cache memory 130 on the basis of the packet size set in the register 422 and then stores the data thus read in the buffer 421. The data stored in the buffer 421 is then transferred to a predetermined disk drive 171 via the disk control unit 410.

The MPA 450 exchanges data with the shared memory 140 via the CHA/DKA connection control unit 150. The DKP 420 accesses the shared memory 140 via the MPA 450 and stores the result of the command processing and the like therein. Further, the DKP 420 can synchronize the control information that is stored in the local memory 430 with control information that is stored in the shared memory 140 via the MPA 450.

FIG. 12 is an explanatory view of an example of the DKA packet size management table T2 that is used by each DKA 120. The DKA packet size management table T2 can be constituted comprising item numbers, disk types DA to DC, bandwidths and packet sizes, for example.

Although FC disk, SCSI disk and SATA disk, or the like, for example, can be cited as disk types DA to DC, the disk types DA to DC are not limited to such disks. Further, individual specifications such as bandwidth are also sometimes different even for the same disk type. Therefore, in this embodiment example, management of the packet size extends as far as including the bandwidth of each disk type. For example, a 2 Gbps disk DA, a 4 Gbps disk DA and a 10 Gbps disk DA are identified as disk types of different types and the corresponding packet sizes are preset in the packet size management table T2.

When a specific example of the DKA packet size management table T2 is described by way of example, where disk DA is concerned, for example, a packet size of about 8 k bytes can be preset in a case where the communication band is 2 Gbps, a packet size of about 16 k bytes can be preset in a case where the communication band is 4 Gbps, and a packet size of about 40 k bytes can be preset in a case where the communication band is 10 Gbps. Further, in the case of disk DB for which the communication band is 3.2 Gbps, a packet size of about 13 k bytes can be preset, for example. In addition, where disk DC is concerned, a packet size of about 6 k bytes can be preset when the communication band is 1.5 Gbps, a packet size of about 12 k bytes can be preset when the communication band is 3 Gbps, and a packet size of about 24 k bytes can be preset when the communication band is 6 Gbps, for example.

Similarly to the CHA packet size management table T1, packet sizes that conform to the respective disk types are preset in the DKA packet size management table T2 for each of the disk types DA to DC. In this embodiment example, settings are made such that the higher the data processing speed of the disk, the larger the packet size. Here, the synthetic data processing speed of the disk varies not only according to the number of disk rotations, the seek time, and so forth, but also according to the control structure of command queuing and so forth. Further, each numerical value that is shown in table T2 is an illustrative example. The present invention is not limited to or by these numerical values. Settings can be made so that the packet size that is used in exchanges with the disk drive 171 and the DKA 120 and the packet size that is used in exchanges with the DKA 120 and the cache memory 130 are equal or substantially match one another.

Figure 13:
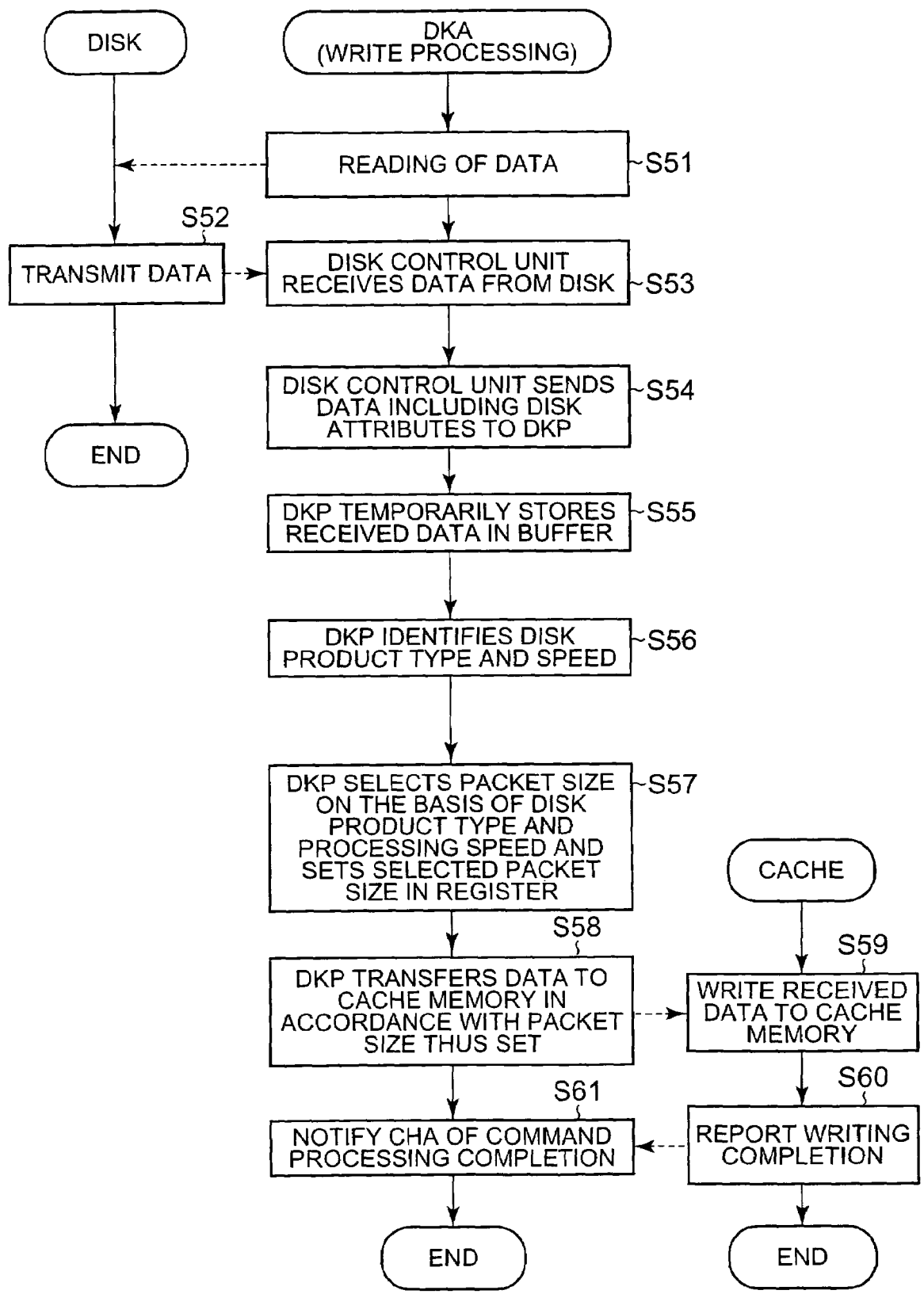
FIG. 13 is a flowchart illustrating WRITE processing by the DKA.

FIG. 13 is a flowchart for WRITE processing by the DKA 120. WRITE processing from the perspective of the DKA 120 is known as processing to write data to the cache memory 130. Therefore, this processing corresponds to the READ processing of the CHA 110.

Upon finding an unprocessed READ command in the shared memory 140, the DKA 120 converts the logical address included in the READ command into a physical address and reads data from a predetermined disk drive 171 (S51). The disk drive 171 transfers the requested data to the DKA 120 (S52). The data from the disk drive 171 is then inputted to the disk control unit 410 (S53).

The disk control unit 410 adds disk type judgment information to the header of the data read from the disk drive 171 before transferring this data to the DKP 420, for example (S54). This disk type judgment information can include information on the disk type and disk processing speed, for example.

Upon receiving data from the disk control unit 410, the DKP 420 temporarily stores the received data in the buffer 421 (S55). The DKP 420 then reads the data header and specifies the type and processing speed of the disk drive 171 on the basis of the disk type judgment information (S56). The DKP 420 references the DKA packet size management table T2, selects the packet size conforming with the disk drive 171, and sets the packet size thus selected in the register 422 (S57).

The DTA 440 reads data from the buffer 421 in accordance with the packet size thus set in the register 422 and transfers this data to the cache memory 130 (S58). Upon receiving data from the DKA 120, the adapter 131 of the cache memory 130 stores this data in a predetermined location in the cache memory 130 (S59) and reports writing completion to the DKA 120 (S60). Upon receiving the writing completion report from the adapter 131 of the cache memory 130, the DKA 120 issues a report to the CHA 110 (S61). This report is issued via the shared memory 140, for example. Further, although, in order to facilitate the description, FIG. 13 illustrates the fact that a report is issued from the DKA 120 to the CHA 110 at the time the data of one block is stored in the cache memory 130, the whole of the data requested by the CHA 110 can be reported at the time of storage in the cache memory 130.

Thereafter, the DKA 120 transfers the data that has been read from the disk drive 171 to the cache memory 130 on the basis of the packet size that conforms to the data processing speed of the disk drive 171. When all the data has been copied to the cache memory 130, the CHA 110 reads data from the cache memory 130 by means of the packet size that conforms to the communication environment with the host 10 and sends the data to the host 10 as stated earlier.

Figure 14:
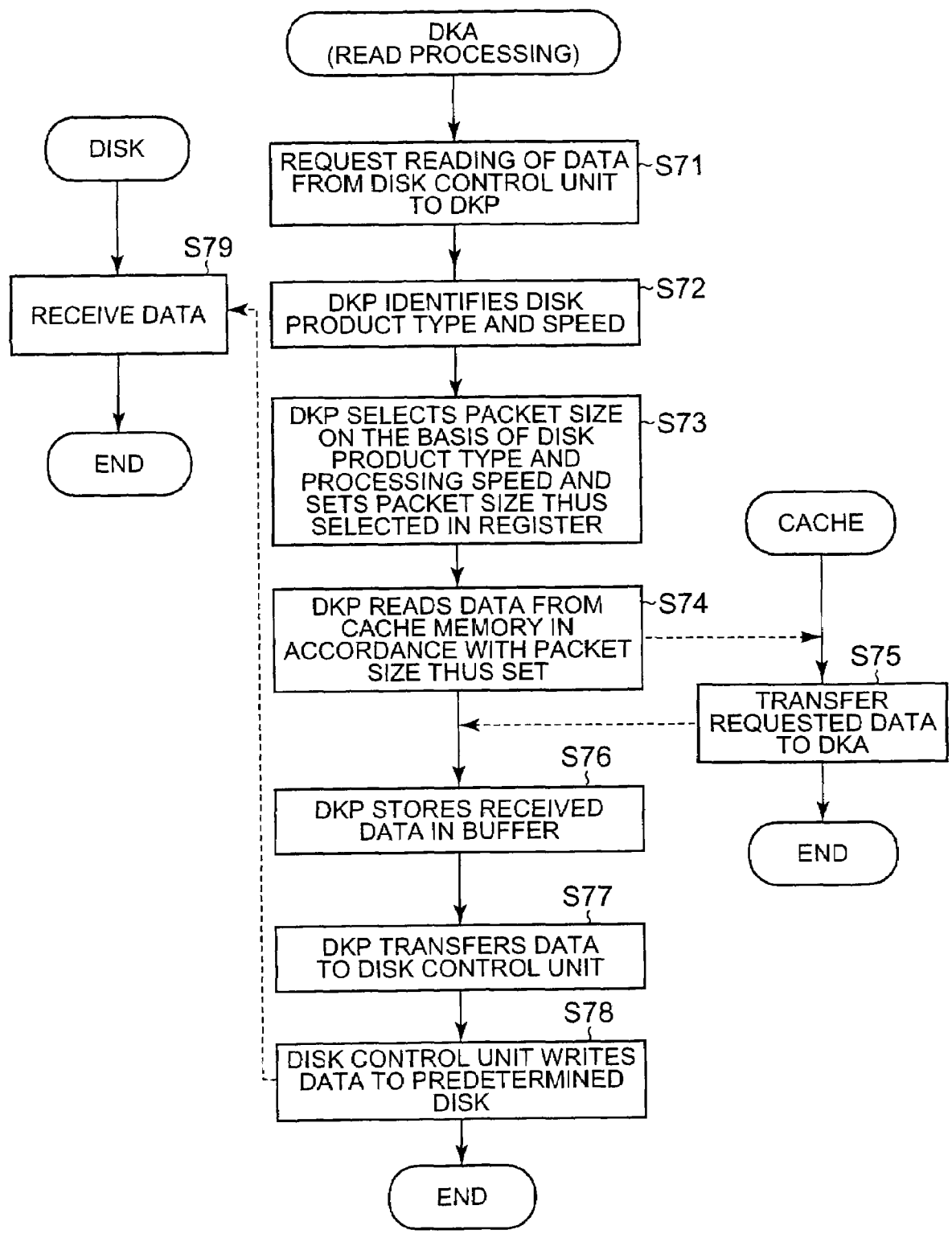
FIG. 14 is a flowchart illustrating READ processing by the DKA.

FIG. 14 is a flowchart showing READ processing by the DKA 120. The READ processing by the DKA 120 denotes processing in which data is read from the cache memory 130 and then written to a predetermined disk drive 171. This READ processing is therefore processing that is executed following the WRITE processing by the CHA 110.

The DKA 120 references the shared memory 140 as required via the MPA 450 and thus finds an unprocessed WRITE command. The disk control unit 410 requests that the DKP 420 read data from the cache memory 130 (S71). At the time of this data reading request, the disk control unit 410 issues notification together with disk type judgment information that includes the type and data processing speed of the disk drive 171 that is to write the data.

The DKP 420 identifies the type and data processing speed of the disk drive 171 constituting the data storage destination on the basis of the disk type judgment information added to the header of the read request from the disk control unit 410 (S72). The DKP 420 reads the packet size that conforms with the type and data processing speed of the disk by referencing the DKA packet size management table T2 and then sets the packet size in the register 422 (S73).

The DKP 420 reads data from the cache memory 130 in accordance with the packet size thus set in the register 422 (S74). The adapter 131 of the cache memory 130 sends the requested data to the DKA 120 by means of the designated packet size (S75).

The DKP 420 temporarily stores the data read from the cache memory 130 in the buffer 421 (S76) and transfers the data stored in the buffer 421 to the disk control unit 410 by means of a packet of the size thus set in the register 422 (S77).

Upon receipt of the data from the DKP 420, the disk control unit 410 stores the data in a predetermined disk drive 171 on the basis of the RAID constitution (S78). For example, in the case of RAID 5, a parity calculation is performed and the data and parity are stored in predetermined respective disk drives 171. Further, in a RAID 1 case, for example, the same data is stored in different disk drives 171. The predetermined respective disk drives 171 then store the data received from the disk control unit 410 (S79).

Because this embodiment example has, as per the earlier embodiment example, a constitution in which the packet size is set variably in accordance with the type of disk drive 171 being used, blockage of a data transfer within the DKA 120 can be prevented, whereby the data transfer efficiency can be raised.

Figure 15:
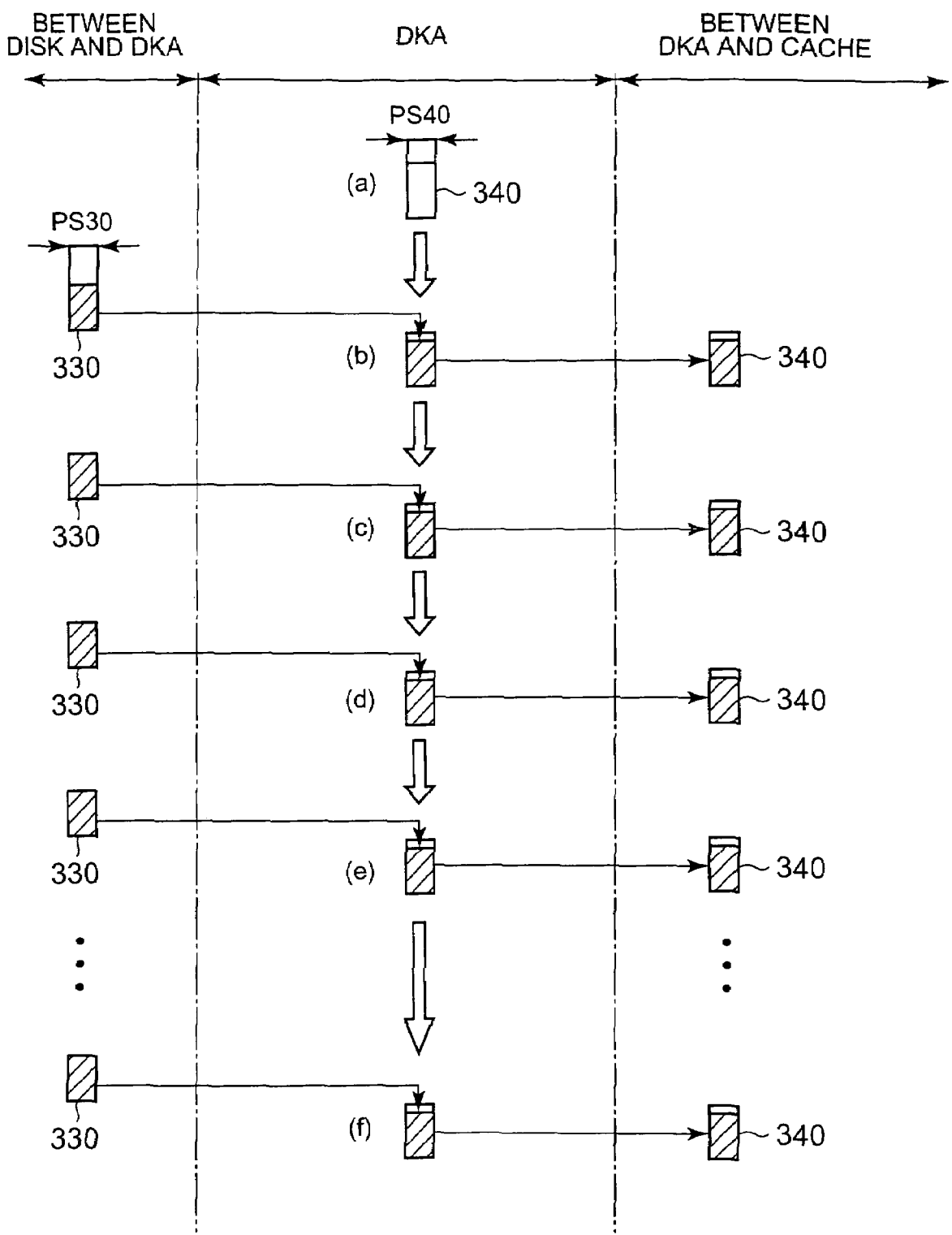
FIG. 15 is an explanatory view that schematically illustrates the appearance of a data transfer from a disk to cache in a case where packet size conformity exists.

For example, as shown in FIG. 15, when data that is read from the disk drive 171 is transferred to the cache memory 130, the size PS30 of a packet 330 used in exchanges between the disk and DKA and the size PS40 of a packet 340 in exchanges between the DKA and cache memory are equal or substantially match one another. Therefore, data that is read from the disk drive 171 can be immediately transferred to the cache memory 130 as a result of being rapidly shifted to packet 340.

Figure 16:
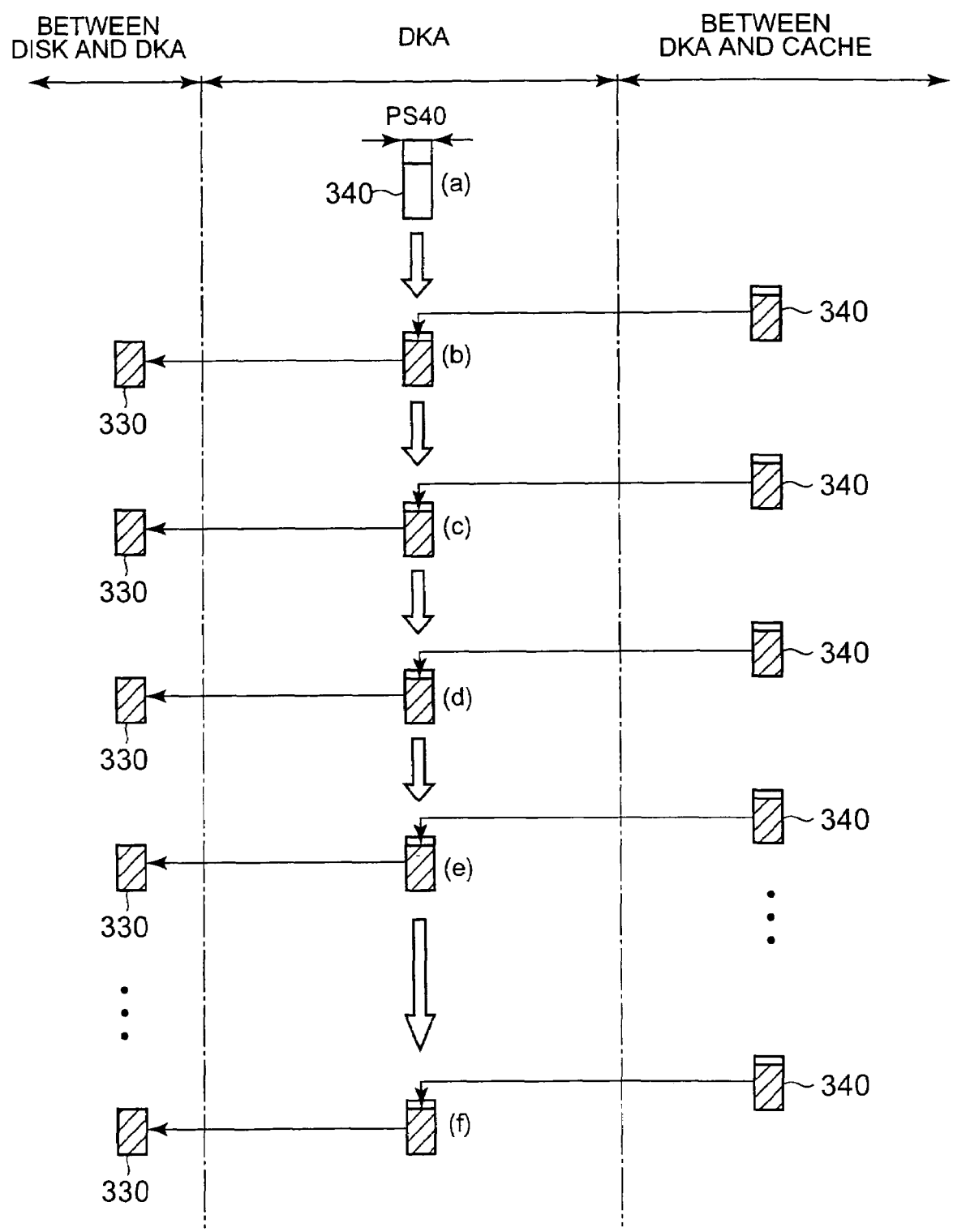
FIG. 16 is an explanatory view that schematically illustrates the appearance of a data transfer from the cache to a disk in a case where packet size conformity exists.

As shown in FIG. 16, a case where data that is read from the cache memory 130 is transferred to the disk drive 171 is also similar. Because the size of the packet 340 used in exchanges between the DKA and cache memory and the size of the packet 330 in exchanges between the disk and DKA are equal or substantially match one another, data that is read from the cache memory 130 is transferred to the disk drive 171 as a result of being shifted rapidly to the packet 330.

Therefore, this embodiment example affords results that are the same as those of the above embodiment example. In addition, the data transfer efficiency within the storage device 100 is also raised above that of the first embodiment example by organically linking the variable control of the internal packet size of the CHA 110 and the variable control of the internal packet size of the DKA 120. Here, there is no need for a match between the packet size that is used by the CHA 110 and the packet size used by the DKA 120.

3. Third Embodiment Example

FIG. 17 is an explanatory view of packet size management tables T1A and T1B that are used by the storage device 100 according to the third embodiment example. In this embodiment example, different packet size management tables are prepared for each command type.

Accordingly, set packet sizes sometimes differ according to the READ and WRITE commands, for example. Therefore, the packet size in the storage device 100 can be controlled more flexibly by variably setting the optimum packet size in accordance with the type of command and the communication environment with the host 10, and hence data transfers suited to command types can also be performed.

Further, in FIG. 17 the CHA packet size management tables T1A and T1B are illustrated by way of example. However, different tables can also be set for each command type in the case of the DKA packet size management table T2.

Furthermore, the present invention is not limited to or by the above embodiments. A person skilled in the art is able to perform a variety of additions and modifications and so forth within the scope of this invention. For example, so too in a case where the interior of the storage device is logically divided to establish a plurality of virtual storage devices, packet sizes can be controlled variably for each virtual storage device.

Further, although the constitution of each embodiment example is such that the optimum packet size is set each time a data transfer with a host or disk drive is started, the constitution is not limited thus. The constitution may be such that the optimum packet size is set for each group data transfer (sequence or exchange in the case of a fiber channel). Alternatively, the constitution may be such that, in a CHA case, the packet size is set only once at the start of an initial data transfer and, when a physical fault in a path is detected, the packet size is reset and the packet size is set once again when an initial data transfer is made following path fault recovery.

What is claimed is:

1. A storage device, comprising:
   an upper level interface control unit that controls data exchanges with a host device;
   a lower level interface control unit that controls data exchanges with a memory drive; and
   a memory unit that is shared by the upper level interface control unit and the lower level interface control unit,
   a packet size management information storage unit that stores first packet size management information for which a first packet size is preset for each of a plurality of types of communication protocols and communication bandwidths that can be used in exchanges with the host device,
   wherein the upper level interface control unit judges the type of communication protocol that is used in exchanges with the host device and, by referencing the first packet size management information, reads and sets the first packet size suited to the communication protocol type thus judged, such that the upper level interface control unit variably sets the first packet size that is used in exchanges with the memory unit on the basis of the type of communication protocol and the communication bandwidth that is used in exchanges of the upper level interface control unit with the host device.

2. The storage device according to claim 1, wherein the upper level interface control unit variably sets the first packet size that is used in exchanges with the memory unit on the basis of the type of access by the host device that is used in exchanges with the host device.

3. The storage device according to claim 1, wherein the upper level interface control unit sets the first packet size larger than a packet size settable by the storage device, upon judging that the communication bandwidth of data exchanges with the host device are faster than a communication bandwidth handle-able by the storage device, on the basis of the type of communication protocol that is used in exchanges with the host device.

4. The storage device according to claim 1, wherein the upper level interface control unit sets the first packet size smaller than a packet size settable by the storage device, upon judging that the communication bandwidth of data exchanges with the host device are slower than a communication bandwidth handle-able by the storage device, on the basis of the type of communication protocol that is used in exchanges with the host device.

5. The storage device according to claim 1, wherein the upper level interface control unit comprises:
   an upper level data transfer unit that controls data exchanges with the host device on the basis of a predetermined communication protocol and a predetermined communication bandwidth;
   a lower level data transfer unit that executes data exchanges with the memory unit via the first packet; and
   a first control unit provided between the upper level data transfer unit and the lower level data transfer unit to control data exchanges between the upper level data transfer unit and the lower level data transfer unit,
   wherein, upon accepting access by the host device, the upper level data transfer unit notifies the first control unit of the type of predetermined communication protocol and predetermined communication bandwidth that is used in exchanges with the host device;
   the control unit sets the first packet size suited to the type of the predetermined communication protocol and predetermined communication bandwidth on the basis of notification from the upper level data transfer unit; and
   the lower level data transfer unit performs data exchanges with the memory unit in accordance with the first packet size thus set by the first control unit.

6. The storage device according to claim 1, wherein the upper level interface control unit sets the first packet size each time the connection with the host device is reset.

7. The storage device according to claim 1, wherein the upper level interface control unit sets the first packet size each time access by the host device is accepted.

8. The storage device according to claim 1, wherein the memory unit temporarily stores data.

9. The storage device according to claim 1, wherein different host devices, which use communication protocols that are each of a different type, are provided;
   the upper level interface control unit is provided in correspondence with a host device of each type and first packet sizes are each set individually in accordance with the various communication protocols and various communication bandwidths; and
   first packets of a plurality of types that are each a different size are used commonly in a system including the storage device and the different host devices.

10. The storage device according to claim 1, wherein the lower level interface control unit variably sets a second packet size that is used in data exchanges with the memory unit in accordance with the type of the memory drive and with a communication bandwidth of communication with the memory drive.

11. The storage device according to claim 10, wherein the lower level interface control unit sets the second packet size larger than a packet size settable by the storage device, when it is judged that the memory drive type is a higher performance memory drive than a performance memory drive handle-able by the storage device.

12. The storage device according to claim 10, wherein the lower level interface control unit sets the second packet size smaller than a packet size settable by the storage device, when it is judged that the memory drive type is a lower performance memory drive than a performance memory drive handle-able by the storage device.

13. A storage device, comprising:
   upper level interface control units of a plurality of types that, in accordance with communication protocols that are used by host devices of a plurality of types, each control data exchanges with each of the host devices;
   a plurality of lower level interface control units that each control data exchanges with memory drives of a plurality of types; and
   a cache memory and shared memory that are shared by the respective upper level interface control units and the respective lower level interface control units, wherein
   (1) each of the upper level interface control units comprises:
   an upper level data transfer unit that controls, on the basis of a predetermined communication protocol, data exchanges with the host device to which the upper level interface control unit is connected;
   a lower level data transfer unit that executes data exchanges with the cache memory via a first packet; and
   a first control unit provided between the upper level data transfer unit and lower level data transfer unit to control data transfers between the upper level data transfer unit and the lower level data transfer unit,
   the upper level data transfer unit notifying the first control unit of the type of communication protocol used in exchanges with the host device when access by the host device is accepted, the first control unit setting the first packet size that is suited to the type of communication protocol on the basis of the notification from the upper level data transfer unit, and the lower level data transfer unit exchanging data with the cache memory in accordance with the first packet size that is set by the first control unit; and
   (2) each of the lower level interface control units comprises:
   a memory drive data transfer unit that controls data exchanges with the memory drive to which the lower level interface control unit is connected;
   a memory data transfer unit that executes data exchanges with the cache memory via a second packet;
   a second control unit provided between the memory drive data transfer unit and the memory data transfer unit to control data transfers between the memory drive data transfer unit and the memory data transfer unit,
   the memory drive data transfer unit notifying the second control unit of information specifying the type of the memory drive when data from the memory drive is inputted, the second control unit setting the second packet size that is suited to the type of the memory drive on the basis of the notification from the memory drive data transfer unit, and the memory data transfer unit exchanging data with the cache memory in accordance with the second packet size thus set by the second control unit.

14. A packet size control method for controlling the internal packet size of a storage device that comprises:
   an upper level interface control unit that controls data exchanges with a host device;
   a lower level interface control unit that controls data exchanges with a memory drive; and
   a memory unit that is shared by the upper level interface control unit and the lower level interface control unit, the storage device packet size control method comprising:
   judging whether the upper level interface control unit has received a predetermined command from the host device;

specifying a communication protocol between the host device and the upper level interface control unit when it is judged that the upper level interface control unit has received the predetermined command from the host device;

referencing first packet size management information in which a first packet size has been preset for each communication protocol of a plurality of types that can be used in exchanges with the host device with the specified communication protocol serving as a search key and reading and setting a first packet size that corresponds with the specified communication protocol; and exchanging data between the cache memory and the upper level interface control unit on the basis of the first packet size thus set, wherein the first packet size thus set corresponds to a settable packet size of the packet size control method which is closest in size to the packet size that is used in exchanges between the host device and the upper level interface control unit in accordance with the specified communication protocol.

\* \* \* \* \*